(12) United States Patent
Lee

(10) Patent No.: US 11,921,374 B2
(45) Date of Patent: Mar. 5, 2024

(54) OPTICAL FILM AND BACK LIGHT UNIT INCLUDING THE SAME

(71) Applicant: CHANGKANG CHEMICAL CO., LTD., Ansan-si (KR)

(72) Inventor: Seongsu Lee, Ansan-si (KR)

(73) Assignee: CHANGKANG CHEMICAL CO., LTD., Ansan-si (KR)

(*) Notice: Subject to any disclaimer, the term of this patent is extended or adjusted under 35 U.S.C. 154(b) by 0 days.

(21) Appl. No.: 18/071,233

(22) Filed: Nov. 29, 2022

(65) Prior Publication Data

US 2024/0027830 A1    Jan. 25, 2024

(30) Foreign Application Priority Data

Jul. 19, 2022    (KR) ........................ 10-2022-0089086

(51) Int. Cl.
     *G02F 1/13357*      (2006.01)
     *G02F 1/1335*      (2006.01)

(52) U.S. Cl.
     CPC .. *G02F 1/133606* (2013.01); *G02F 1/133614* (2021.01)

(58) Field of Classification Search
     CPC .................................................... G02B 6/0053
     See application file for complete search history.

(56) References Cited

U.S. PATENT DOCUMENTS 11,513,392 B1 * 11/2022 Luo ................... G02F 1/133605
2007/0263412 A1    11/2007 Lee
2012/0026431 A1 * 2/2012 Coggio ............... G02B 6/0056
                                                 362/19

(Continued)

FOREIGN PATENT DOCUMENTS

CN    216979538 U    7/2022
JP    2007304553 A    11/2007
(Continued)

OTHER PUBLICATIONS

Taiwan Patent and Trademark Office, Notification of the Opinions On Examination regarding 11220939330, dated Sep. 20, 2023.

*Primary Examiner* — Eric T Eide
(74) *Attorney, Agent, or Firm* — NKL Law; Jae Youn Kim

(57) ABSTRACT

A backlight unit according to various embodiments of the present invention includes a light source, a color conversion sheet disposed above the light source for converting a color of light emitted from the light source and an optical film disposed on the color conversion sheet. The optical film further comprises a first sheet having a first pattern layer including a plurality of pyramid patterns formed on one side of a first base and a second pattern layer including a different pattern from the plurality of pyramid patterns disposed on the other surface of the first base and a second sheet having a third pattern layer including a plurality of pyramid patterns formed on one side of a second base and a fourth pattern layer corresponding to the second pattern layer formed on the other side of the second base. The second pattern layer and the fourth pattern layer include a plurality of irregular protrusion portions. The first sheet and the second sheet is laminated by an adhesive material disposed between the second pattern layer and the third pattern layer.

20 Claims, 21 Drawing Sheets

(56) References Cited

U.S. PATENT DOCUMENTS

| | | | |
|---|---|---|---|
| 2013/0308337 A1* | 11/2013 | Chang ................. | G02B 5/0231 |
| | | | 362/606 |
| 2016/0011339 A1* | 1/2016 | Namikawa ........... | G02B 5/0226 |
| | | | 428/207 |
| 2018/0039012 A1* | 2/2018 | Shin ..................... | G02B 6/0056 |
| 2021/0088712 A1* | 3/2021 | Cheng ................. | G02B 6/0068 |
| 2022/0057547 A1 | 2/2022 | Kim et al. | |
| 2022/0146882 A1 | 5/2022 | Kim et al. | |

FOREIGN PATENT DOCUMENTS

| | | |
|---|---|---|
| JP | 2012-56234 A | 3/2012 |
| JP | 2022035921 A | 3/2022 |
| JP | 2022075647 A | 5/2022 |
| KR | 10-2020-0092026 A | 8/2020 |
| TW | 2021-38887 A | 10/2021 |
| WO | 2019-135190 A1 | 7/2019 |

\* cited by examiner

|  | #10 | #11 |
|---|---|---|
| Dot Density | 7% | |
| Dot Size | 100μm | 130μm |
| Pattern Height | 33 | 44 |
| Diameter | 100 | 130 |
| Aspect Ratio | 0.33 | 0.338 |
| Brightness Distribution | | |
| Center Brightness Value | 51377.30 | 47398.30 |
| Center Brightness Ratio | 79.6% | 73.5% |
| Shielding Ratio | 123.1% | 143% |

FIG.7B

OPTICAL FILM AND BACK LIGHT UNIT INCLUDING THE SAME

CROSS-REFERENCE TO RELATED APPLICATION(S)

This application is based on and claims priority under 35 U.S.C. 119 to Korean Patent Application No. 10-2022-0089086, filed on Jul. 19, 2022, in the Korean Intellectual Property Office, the disclosure of which is herein incorporated by reference in its entirety.

TECHNICAL FIELD

The present invention is generally related to an optical film and a backlight unit including the same.

BACKGROUND

In general, a Liquid Crystal Display (LCD) module includes a backlight unit that uniformly irradiates light to the entire screen of an electronic device. The backlight unit is of an edge type that requires a light guide plate located on the side of the substrate that converts linear light source of the lamp into surface light source, and of a direct type that requires the lamp located directly below the substrate thereby no light guide plate is necessary. Between the two types, the direct type backlight unit is widely used in a recent Liquid Crystal Display module because it has a high light-use efficiency, a simple configuration, and has no limitation on the size of a substrate. A general direct type backlight unit may include a light source, a diffusion sheet and prism sheets condensing light. After the light emitted from the light source is diffused through the diffusion sheet, it may be transmitted to the liquid crystal panel through the prism sheets provided above.

As a light source, a Liquid Crystal Display module using a mini-LED (Light Emitting Diode) and/or a micro-LED which are advantages for miniaturization, weight reduction, and/or low power consumption is being actively used. Utilizing mini-LEDs or micro-LEDs as a light source for the LCD module can realize sharper image quality over a conventional light source without having restriction with respect to a size and shape of the display device because each chip of those LEDs can configure an individual pixel or a light source. Thus, research on a backlight unit improving the LED light characteristics is being actively conducted with the miniaturization of the size of the LED chip.

A direct type backlight unit utilizing a mini-LED or a micro-LED as a light source may use a diffusion sheet to convert light from a point light source into a surface light source. Because the direct type backlight unit arranges the light source on a plane substrate, a thick diffusion sheet or a plurality of stacked diffusion sheets may be used to prevent the shape of the light source (e.g., the shape of a mini-LED or micro-LED) from being visually recognized by the liquid crystal panel.

According to one embodiment, a shielding sheet may be additionally or alternatively included to the diffusion sheet for shielding a hot spot, which is a phenomenon that the shape of the light source is visually recognized by the liquid crystal panel.

Having the shielding sheet (and/or the diffusion sheet) can be problematic for the thinning of the liquid crystal display device because the thickness of the sheet must be somewhat thick for shielding performance preventing the shape of the light source from being visually recognized by the liquid crystal panel. On the other hand, if the thickness of the shielding sheet is excessively thick, there may be a problem where the brightness of the liquid crystal display device is greatly reduced. As described above, for the backlight unit including the shielding sheet, the shielding performance and the brightness performance may depend on the thickness of the shielding sheet, thus the shielding performance and the brightness performance are in a trade-off relationship with each other.

In the present invention, it provides an optical film for a backlight unit of the LCD module having an excellent performance preventing the shape of the light source from being visually recognized by the liquid crystal panel (so called "shielding performance") as well as having a high brightness (so called "brightness performance) without using a thick diffusion sheet through various embodiments of the present invention.

Effects provided in the present invention are not limited to the above-mentioned effects, and other effects not mentioned may be clearly understood by those of ordinary skill in the art to which the present invention belongs from the description below.

SUMMARY

According to an embodiment of the invention, there is provided that a backlight unit that includes a backlight unit comprising a light source, a color conversion sheet disposed above the light source for converting a color of light emitted from the light source and an optical film disposed on the color conversion sheet further comprising a first sheet having a first pattern layer including a plurality of pyramid patterns formed on one side of a first base and a second pattern layer including a different pattern from the plurality of pyramid patterns disposed on the other surface of the first base and a second sheet having a third pattern layer including a plurality of pyramid patterns formed on one side of a second base and a fourth pattern layer corresponding to the second pattern layer formed on the other side of the second base wherein the second pattern layer and the fourth pattern layer include a plurality of irregular protrusion portions and wherein the first sheet and the second sheet are laminated by an adhesive material disposed between the second pattern layer and the third pattern layer.

In an embodiment, the optical film for the backlight unit in the present invention includes the plurality of pyramid patterns of the first pattern layer and the plurality of pyramid patterns of the third pattern layer having a plurality of rows in a first direction and a plurality of columns in a second direction wherein the first direction and the second direction is perpendicular each other.

In an embodiment, the plurality of pyramid patterns of the first pattern layer are intaglio pyramid patterns formed by etching the one side of the first base and the plurality of pyramid patterns of the third pattern layer are intaglio pyramid patterns formed by etching the one side of the second base for the optical film in the backlight unit in the present invention.

In an embodiment, the refractive index of the first pattern layer and the refractive index of the third pattern layer are the same as each other for the optical film in the backlight unit in the present invention.

In an embodiment, the refractive index of the first pattern layer and the refractive index of the third pattern layer are approximately 1.47 to 1.70 for the optical film in the backlight unit in the present invention.

In an embodiment, each of the plurality of pyramid patterns forms an apex angle defined as an angle between two opposing faces among four faces of a pyramid shape and a first apex angle of the first pattern layer is approximately 870 to 930 and a second apex angle of the third pattern layer is approximately 87° to 93° for the optical film in the backlight unit in the present invention.

In an embodiment, a density of the plurality of protrusion portions occupying in an area of the second and fourth pattern layer is approximately 5% to 9% for the optical film in the backlight unit in the present invention.

In an embodiment, an average diameter of the plurality of protrusion portions in the second pattern layer is approximately 30 μm and an average diameter of the plurality of protrusion portions in the fourth pattern layer is approximately 60 μm for the optical film in the backlight unit in the present invention.

In an embodiment, an aspect ratio of the second pattern layer and the fourth pattern layer is in the range of approximately 0.23 to 0.5 for the optical film in the backlight unit in the present invention.

In an embodiment, an average height of the plurality of protrusion portions in the second pattern layer is approximately 6.9 μm and an average height of the plurality of protrusion portions in the fourth pattern layer is approximately 30 μm for the optical film in the backlight unit in the present invention.

In an embodiment, a haze of the second pattern layer and the fourth pattern layer is approximately 13% to 85% for the optical film in the backlight unit in the present invention.

In an embodiment, the plurality of irregular protrusion portions of the second pattern layer and the fourth pattern layer have a curved shape for the optical film in the backlight unit in the present invention.

According to another embodiment of the invention, there is provided that an optical film that includes a first sheet having a first pattern layer including a plurality of pyramid patterns formed on one side of a first base and a second pattern layer including a different pattern from the plurality of pyramid patterns disposed on the other surface of the first base and a second sheet having a third pattern layer including a plurality of pyramid patterns formed on one side of a second base and a fourth pattern layer corresponding to the second pattern layer formed on the other side of the second base wherein the second pattern layer and the fourth pattern layer include a plurality of irregular protrusion portions and wherein the first sheet and the second sheet are laminated by an adhesive material disposed between the second pattern layer and the third pattern layer.

In another embodiment, the refractive index of the first pattern layer and the refractive index of the third pattern layer are the same as each other for the optical film in the present invention.

In another embodiment, each of the plurality of pyramid patterns forms an apex angle defined as an angle between two opposing faces among four faces of a pyramid shape and a first apex angle of the first pattern layer is approximately 87° to 93° and a second apex angle of the third pattern layer is approximately 87° to 93° for the optical film in the present invention.

In another embodiment, a density of the plurality of protrusion portions occupying in an area of the second and fourth pattern layer is approximately 5% to 9% for the optical film in the present invention.

In another embodiment, an average diameter of the plurality of protrusion portions in the second pattern layer is approximately 30 μm and an average diameter of the plurality of protrusion portions in the fourth pattern layer is approximately 60 μm for the optical film in the present invention.

In another embodiment, an aspect ratio of the second pattern layer and the fourth pattern layer is in the range of approximately 0.23 to 0.5 for the optical film in the present invention.

In another embodiment, an average height of the plurality of protrusion portions in the second pattern layer is approximately 6.9 μm and an average height of the plurality of protrusion portions in the fourth pattern layer is approximately 30 μm for the optical film in the present invention.

In another embodiment, a haze of the second pattern layer and the fourth pattern layer is approximately 13% to 85% for the optical film in the present invention.

BRIEF DESCRIPTION OF THE DRAWINGS

The components of the following figures are shown to emphasize the general principles of the present invention and are not necessarily drawn to scale, although at least one of the figures may be drawn to scale. Reference characters designating corresponding components are repeated as necessary throughout the figures for the sake of consistency and clarity.

FIGS. 7A and 7B are tables illustrating a brightness ratio and a shielding ratio with respect to a diameter of a mat pattern of an optical film according to various embodiments of the present invention.

DETAILED DESCRIPTION

Figure 1:
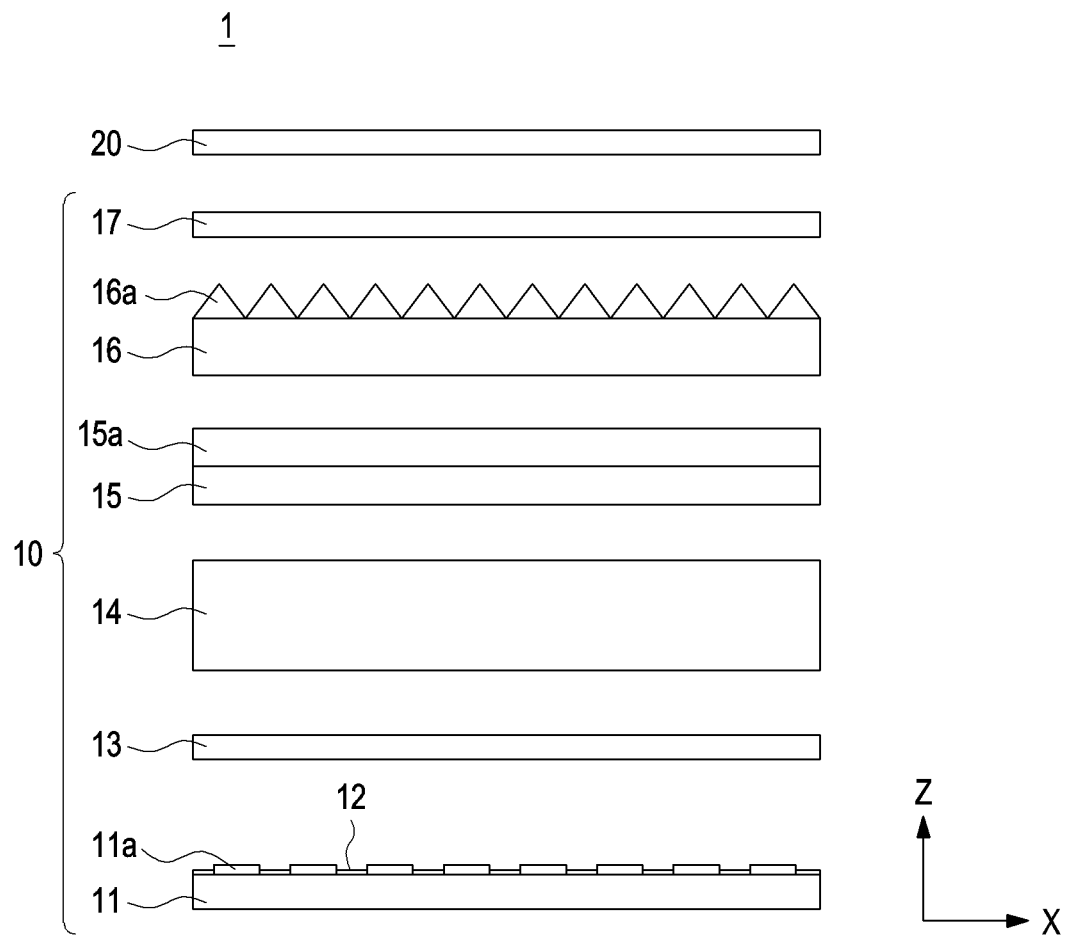
FIG. 1 is a drawing showing a Liquid Crystal Display (LCD) including a diffusion sheet according to various embodiments of the present invention.

Various embodiments and terms used in the specification are not intended to limit the technical features described in the specification to specific embodiments, but it should be understood to include various modifications, equivalents, or substitutions of the embodiments. In connection with the description of the drawings, similar reference numerals may be used for similar or related components. The singular form of the noun corresponding to the item may include one or more of the elements unless the relevant context clearly dictates otherwise.

According to various embodiments, each component (e.g., a film or a sheet) of the above-described components may include a singular or a plurality of entities, and some of the plurality of entities may be separately disposed in other components. According to various embodiments, one or more components or operations among the above-described corresponding components may be omitted, or one or more other components or operations may be added. Alternatively, or additionally, a plurality of components (e.g., a film or a sheet) may be integrated into one component. In this case, the integrated component may perform one or more functions of each component of the plurality of components identically or similarly to those performed by the corresponding component among the plurality of components prior to the integration.

Embodiments will be described with reference to the associating drawings. In describing the present embodiment, the same names and the same reference numerals are used for the same components, and an additional description thereof will be omitted. In addition, in describing the embodiment of the present invention, the same names and reference numerals are used for components having the same functions, and it is substantially not completely the same as in the prior art.

According to various embodiments, terms such as "comprise" or "have" are intended to designate the presence of a feature, number, step, operation, component, part, or combination described in the specification. It should be understood, however, that the above does not preclude the possibility of addition or existence of one or more of other features, or numbers, steps, operations, components, parts, or combinations.

FIG. 1 is a drawing showing a Liquid Crystal Display (LCD) including a diffusion sheet according to various embodiments of the present invention.

In FIG. 1, a Liquid Crystal Display module 1 includes a backlight unit 10 and a liquid crystal panel 20. According to various embodiments, the backlight unit 10 is disposed toward the rear surface (the side facing the −Z direction) of the liquid crystal panel 20 to emit light to the liquid crystal panel 20. The backlight unit 10 includes a substrate 11 including a light source 11a, a color conversion sheet 13, diffusion sheets 14 and 17, and prism sheets 15 and 16. Although not shown in the drawings, the backlight unit 10 can further include a reflective polarizing sheet.

According to various embodiments, the light source 11a is a configuration for emitting light to the rear surface of the liquid crystal panel 20 and is disposed on one surface of the substrate 11. The light source 11a can be a Light Emitting Diode (referred to as LED). The light source 11a includes, for example, a plurality of LED chips 11a for emitting light. Depending on the size of the LED chip, large LEDs (chip size: 1,000 μm or more), middle LEDs (chip size: 300-500 μm), and small LEDs (chip size: 200-300 μm), mini-LEDs (chip size 100-200 μm), and micro-LEDs (chip size: 100 μm or less) are available to configure the light source. Here, the LED includes material such as InGaN or GaN. Light emitted from the light source 11a is emitted toward the liquid crystal panel 20 (−Z direction). Light emitted from the light source 11a passes through the color conversion sheet 13 and be incident on the diffusion sheet 14.

According to various embodiments, the reflective sheet 12 can be formed on the surface of the substrate 11. The reflective sheet 12 can include material such as $BaSO_4$, $TiO_2$, $CaCo_3$, $SiO_2$, $Ca_3(SO_4)_2$ or may include material such as Ag. Ag can be deposited or coated between the light sources 11a and on the substrate 11. The reflective sheet 12 can also reflect light which was emitted from the light source 11a, transmitted through the color conversion sheet 13, the diffusion sheets 14 and 17, and the prism sheets 15 and 16, and then reflected back to the substrate 11 due to the interfacial reflection. It may serve to reflect the reflected light back into the emitted direction of the light. Through this process, loss of light can be minimized. As a result, the reflective sheet 12 can perform light recycling.

According to various embodiments, the color conversion sheet 13 converts the color of the light emitted from the light source 11a. For example, the light of the mini-LEDs or micro-LEDs can be blue light (450 nm). In this case, the blue light needs to be converted into white light. The color conversion sheet 13 transmits blue light emitted from the light source 11a while simultaneously converting blue light into white light.

According to various embodiments, the diffusion sheets 14 and 17 uniformly disperse light incident from the color conversion sheet 13. The diffusion sheets 14 and 17 include at least one of a curable resin (e.g., urethane acrylate, epoxy acrylate, ester acrylate and radical generating monomer) to which light diffusing agent beads are added. It can be used alone or mixed) to cause light diffusion by the optical powder bead by depositing the solution. In addition, the diffusion sheets 14 and 17 can have a protrusion pattern (or protrusion) having a uniform or non-uniform size shape (e.g., a spherical shape) to promote light diffusion.

According to various embodiments, the diffusion sheets 14 and 17 may include a lower diffusion sheet 14 and an upper diffusion sheet 17. The lower diffusion sheet 14 is disposed between the color conversion sheet 13 and the prism sheet 15, and the upper diffusion sheet 17 is disposed between the prism sheet 16 and the liquid crystal panel 20. If the backlight unit 10 further includes a reflective polarizing sheet, the upper diffusion sheet 17 may be disposed between the prism sheet 16 and the reflective polarizing sheet.

According to various embodiments, the prism sheets 15 and 16 may condense incident light using an optical pattern formed on the surface, and then emit the light to the liquid crystal panel 20. The prism sheets 15 and 16 may include a light-transmitting base film and a prism pattern layer formed on an upper surface (a surface facing the +Z-axis direction) of the base film. The prism pattern layer may be formed as an optical pattern layer in the form of a triangular array in which an inclined surface of a specified angle (e.g., an inclined surface of 45°) is formed to improve brightness in the plane direction. The prism patterns of the prism pattern layer may have a triangular prism shape, and one surface of the triangular prism may be disposed to a face the base film.

According to an embodiment, the prism sheets 15 and 16 includes the first prism sheet 15 and the second prism sheet 16 to form a composite prism sheet structure. Here, the second prism sheet 16 may be disposed to overlap the upper surface of the first prism sheet 15. In the first prism sheet 15, a plurality of first prism patterns may be arranged side by side. Each of the first prism patterns may have a structure extending in one direction. For example, the vertex lines 15a of each of the first prism patterns may be formed to extend toward the X-axis direction. Similarly, in the second prism sheet 16, a plurality of second prism patterns may also be arranged in parallel with each other. Each of the second prism patterns may have a structure extending in one direction. For example, the vertex lines 16a of each of the second prism patterns may be formed to extend toward the Y-axis direction. Here, the extending direction of the first prism patterns and the extending direction of the second prism patterns are illustrated as being directed to the X-axis and the Y-axis for convenience of description. However, it is not limited to the illustrated embodiment, and may be directed in a direction other than the X-axis or the Y-axis.

According to various embodiments, a reflective polarizing sheet (not shown) is provided on the prism sheets 15 and 16 and the upper diffusion sheet 17 to collect light from the prism sheets 15 and 16 and diffused by the upper diffusion sheet 17. It can serve to transmit some polarized light and reflect other polarized light downward.

According to various embodiments, the liquid crystal panel 20 may refract the light emitted from the light source 11a in a predetermined pattern according to an electrical signal. The refracted light may pass through a color filter and a polarization filter disposed on the front surface of the liquid crystal panel 20 to form a screen.

Figure 2:
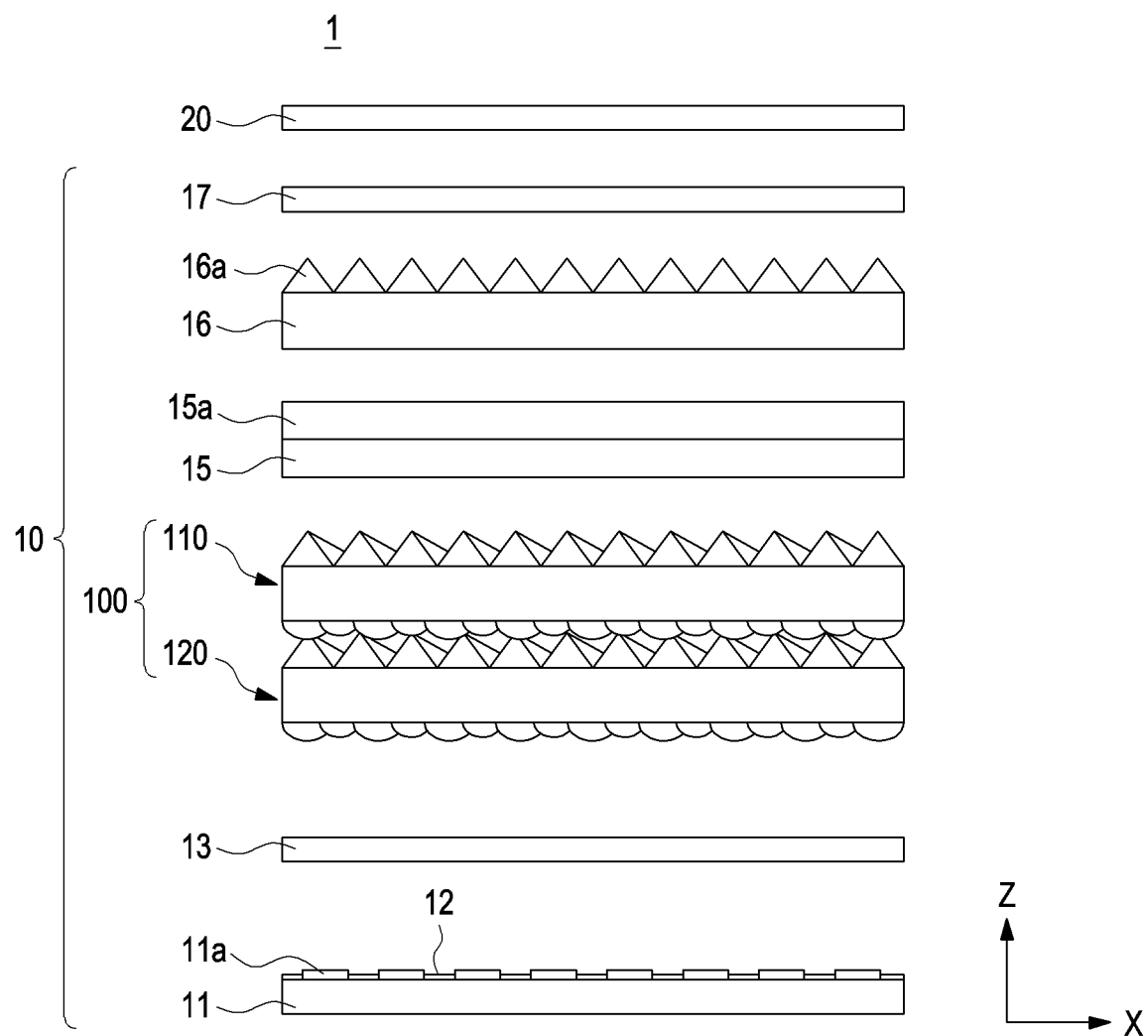
FIG. 2 is a drawing showing a backlight unit including an optical film where a plurality of sheets are laminated and a LCD including the backlight unit according to various embodiments of the present disclosure invention.

FIG. 2 is a drawing showing a backlight unit including an optical film where a plurality of sheets are laminated and a LCD including the backlight unit according to various embodiments of the present disclosure invention.

In FIG. 2, a LCD module 1 according to an embodiment of the present invention includes a backlight unit 10 and a liquid crystal panel 20. The backlight unit 10 includes a substrate 11 including a light source 11a, a color conversion sheet 13, an optical film 100, prism sheets 15 and 16, and a diffusion sheet 17. According to an embodiment, the reflective sheet 12 may be formed on one surface of the light source 11a.

According to an embodiment, at least one of these components (e.g., the diffusion sheet 17) can be omitted, or one or more other components (e.g., a reflective polarizing sheet (not shown)) can be added in the backlight unit 10. Below, descriptions of portions overlapping those of FIG. 1 will be omitted.

The LCD module 1 according to an embodiment of the present invention provides an optical film configured by lamination. The optical film also can replace a diffusion sheet 14 or can be added to the diffusion sheet 14. Below, at least one optical film may be provided on one side to replace the lower diffusion sheet 14 as an example for the explanation of drawings in the present disclosure.

In the present disclosure, the term "optical film" refers to a diffusion sheet including a first pattern on one side of a transparent base (referred to as "base") and another diffusion sheet further including a second pattern provided on the other side of the base where the two diffusion sheets are laminated each other. According to one embodiment, at least one optical film may include a structure in which two optical films are stacked on each other. However, it is not limited to the two stacked optical films, and in some cases, it may include three or more optical films stacked. In the drawing of FIG. 2, although it is illustrated somewhat exaggeratedly for the convenience of explanation, it is shown that very thin two sheets 110 and 120 are laminated to form a first optical film 100.

In this disclosure, "Lamination" may mean that at least one of the two sheets is provided with an adhesive and bonded each other. For example, because a portion of the sheet (e.g., a pattern layer) includes an adhesive material, the pattern layer itself may have adhesiveness. As a result, the optical film may mean a integrated optical film where a plurality of sheets are bonded each other. The integrated optical film can provide a backlight unit that is thinner and has excellent shielding performance over an embodiment where it is not laminated but is simply stacked.

According to various embodiments of the present invention, for a case where the two diffusion sheets 110 and 120 form one optical film, a thickness of a base for a first sheet 110 and a second sheet 120 is approximately under 100 μm and an optical film 100 may be configured by laminating the two sheets each other. The first optical film 100 of the present invention is disposed on a color conversion sheet 13 and it can replace a lower diffusion sheet 14 or can be additionally provided.

An optical film 100 according to various embodiments of the present invention (it can be called in a short form as a "laminated optical film"), for example, can provide high rigidity with excellent shielding performance over an embodiment where two or three sheets of approximately 100 μm or approximately 160 μm thick are simply stacked (it can be called in a short form as a "non-laminated optical film") while it is a several m thinner than the non-laminated optical film. For example, according to the simulation results conducted by the applicant, comparing to a non-laminated optical film where three different conventional diffusion sheets are simply stacked has a thickness of approximately 330 µm to 490 µm, two laminated optical films (e.g., four diffusion sheets) having a thickness of approximately 460 µm to 510 µm is thinner than the non-laminated optical film with the reference to a single diffusion sheet and provide brightness which corresponds to equal or excellent to the non-laminated optical film.

Figure 3:
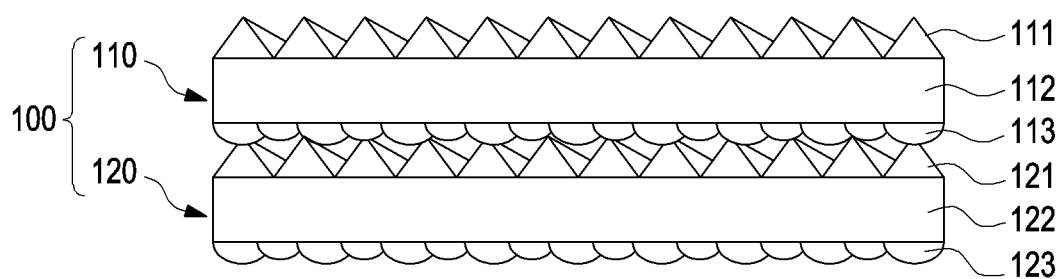
FIG. 3 is a sideview showing an optical film where a plurality of sheets are laminated according to various embodiments of the present invention.

FIG. 3 is a sideview showing an optical film where a plurality of sheets are laminated according to various embodiments of the present invention.

Figure 4:
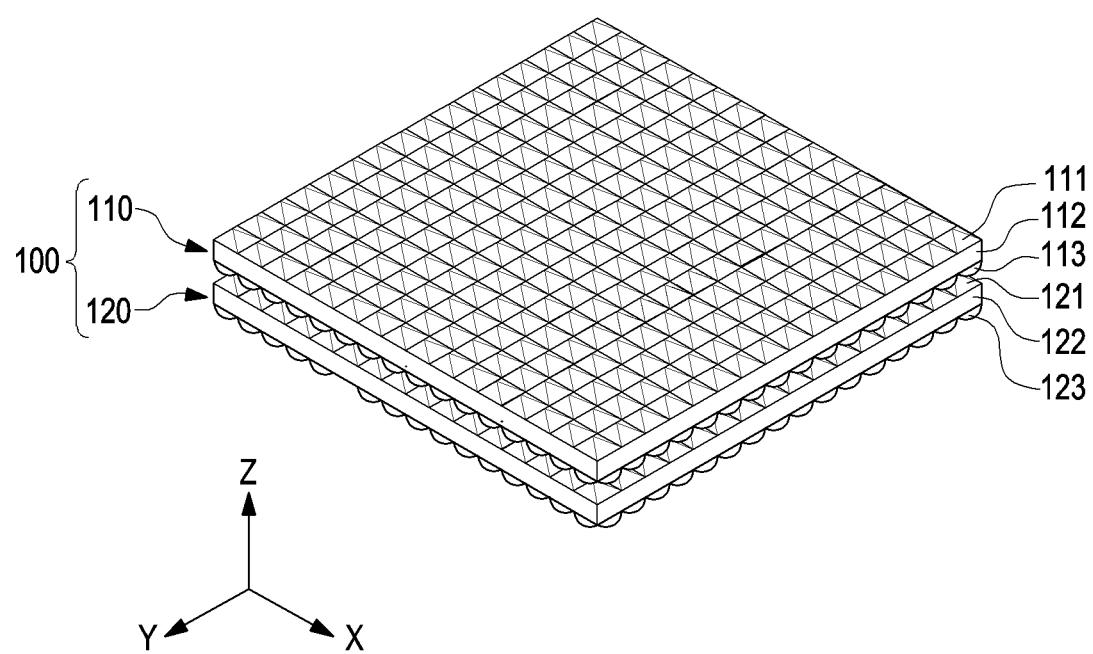
FIG. 4 is a perspective view showing an optical film where a plurality of sheets are laminated according to various embodiments of the present invention.

FIG. 4 is a perspective view showing an optical film where a plurality of sheets are laminated according to various embodiments of the present invention.

In the present disclosure, a backlight unit (e.g., a backlight unit 10 of FIGS. 1 and 2) may include a first optical film 100. The first optical film 100 may include a first sheet 110 and a second sheet 120 laminated with the first sheet 110.

According to one embodiment, the first sheet 110 of the optical film 100 may comprise a first base 112. The first sheet 110 comprises a first pattern layer 111 having a first pattern and formed on one side of the first base 112 and a second pattern layer 113 having a second pattern and formed on the other side of the first base 112 where the second pattern is different from the first pattern. A second sheet 120 of the optical film 100 may include a second base 122. The second sheet 120 includes a third pattern layer 121 having a third pattern and formed on one side of the second base 122 and a fourth pattern layer 123 having a fourth pattern and formed on the other side of the second base 122 where the fourth pattern is different from the third pattern.

According to one embodiment, the first sheet 110 and the second sheet 120 of the optical film 100 may have a structure corresponding to each other. For example, a pattern configuration of the first pattern layer 111 of the first sheet 110 and a pattern configuration of the third pattern layer 121 of the second sheet 120 may be the same or similar to each other. For another example, a pattern configuration of the second pattern layer 113 of the first sheet 110 and a pattern configuration of the fourth pattern layer 123 of the second sheet 120 may be the same or similar to each other.

According to an embodiment, the first base 112 and the second base 122 may have corresponding thicknesses. For example, the first base 112 and the second base part 122 may have a thickness of about 100 µm or less. For example, the first base 112 and/or the second base 122 may have one of approximately 38 µm, 50 µm and 75 µm for its thickness, respectively. However, the thickness of the first base 112 and the second base 122 is not limited to the above example, and may be variously designed and changed to a thickness suitable for supporting the pattern layers. According to another embodiment, the thickness of the second base 122 may be formed to be thicker than the thickness of the first base 112. For example, if the thickness of the base is thin, it may be damaged by the heat generated by the light source 11a and a phenomenon in which the sheet swells unevenly (sheet-swelling phenomenon) may occur. Therefore, by forming the thickness of the second base 122 which is close to the light source 11a to be thicker than the thickness of the first base 112, it is possible to prevent the sheet from puffing up unevenly and to improve the reliability of the product.

According to an embodiment, the brightness of the first optical film 100 may be improved by using the refractive index of each layer. As the pattern configuration of the first pattern layer 111 and the third pattern layer 121 in the first optical film 100 corresponds to each other, the refractive index may be set to correspond each other. For example, the refractive indices of the first pattern layer 111 and the third pattern layer 121 may be approximately 1.47 to 1.70, respectively. For another example, the refractive index of the first pattern layer 111 and the third pattern layer 121 may be approximately 1.65, respectively. As the pattern configuration of the second pattern layer 113 and the fourth pattern layer 123 in the first optical film 100 can correspond to each other, the refractive index can be set to correspond each other. For example, the refractive indices of the second pattern layer 113 and the fourth pattern layer 123 may be approximately 1.45 to 1.55, respectively. For another example, the refractive index of the second pattern layer 113 and the fourth pattern layer 123 may be approximately 1.49, respectively. According to one embodiment, when the second pattern layer 113 is coated with an adhesive material, the refractive index may be approximately 1.51.

Figure 5A:
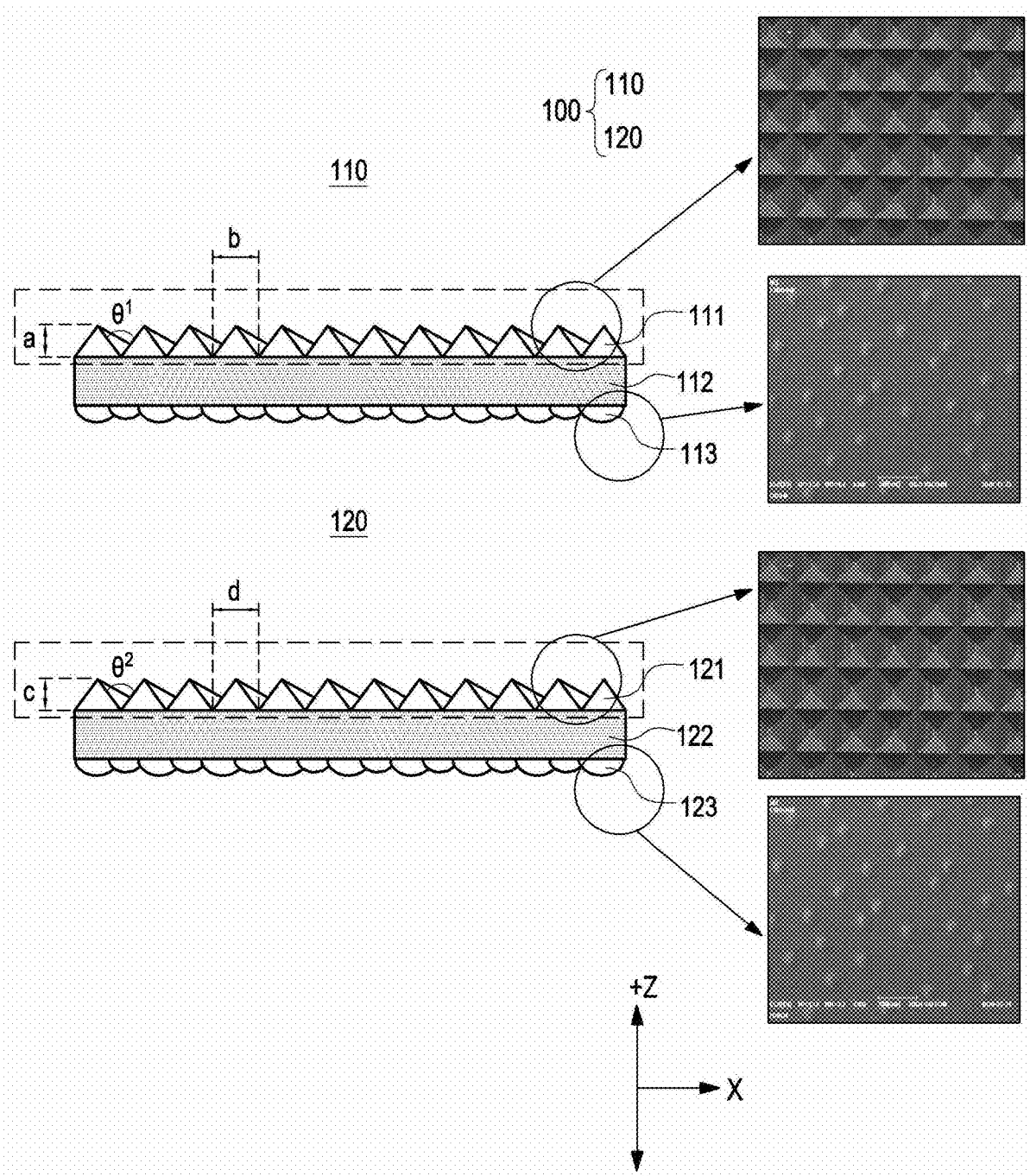
FIG. 5A is a drawing illustrating a plurality of sheets included in an optical film according to various embodiments of the present invention.

FIG. 5A is a drawing illustrating a plurality of sheets included in an optical film according to various embodiments of the present invention.

Figure 5B:
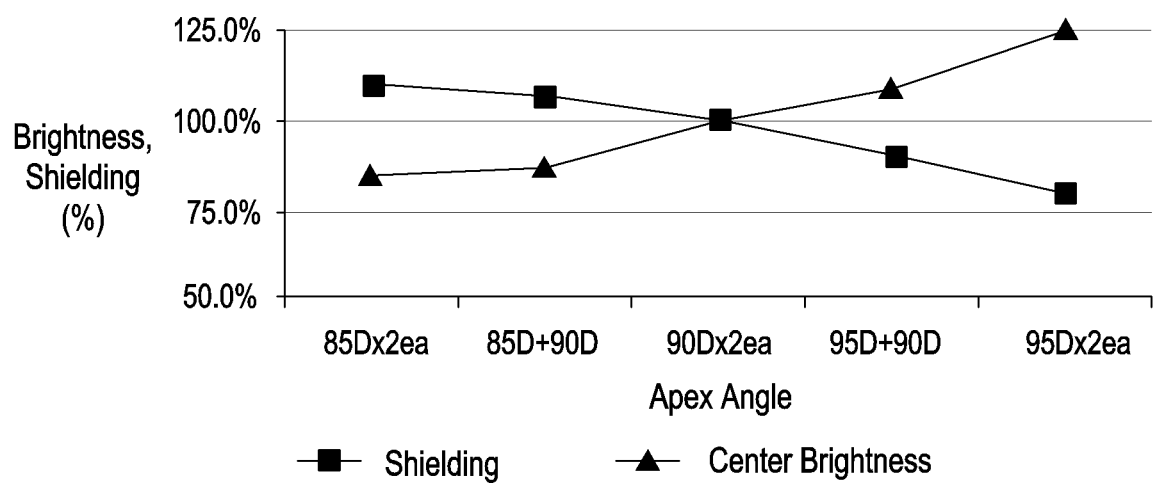
FIG. 5B is a graph illustrating a brightness ratio and a shielding ratio with respect to a peak angle of a pyramid pattern of an optical film according to various embodiments of the present invention.

FIG. 5B is a graph illustrating a brightness ratio and a shielding ratio with respect to a peak angle of a pyramid pattern of an optical film according to various embodiments of the present invention.

Figure 5C:
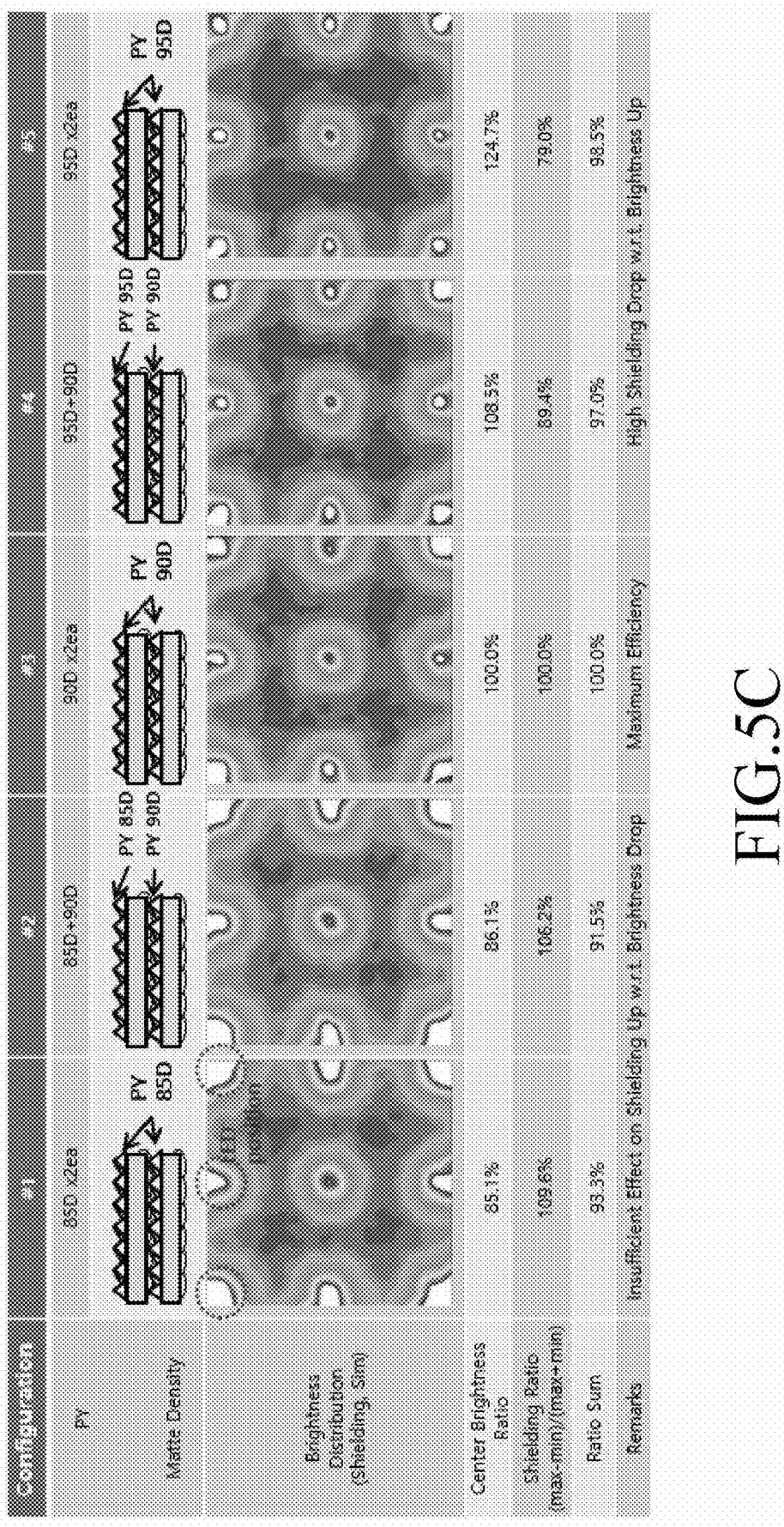
FIG. 5C is a table illustrating a brightness ratio and a shielding ratio with respect to an apex angle of a pyramid pattern of an optical film according to various embodiments of the present invention.

FIG. 5C is a table illustrating a brightness ratio and a shielding ratio with respect to an apex angle of a pyramid pattern of an optical film according to various embodiments of the present invention.

In the present disclosure, a backlight unit (e.g., a backlight unit 10 of FIGS. 1 and 2) may include a first optical film 100. The optical film 100 may include a first sheet 110 and a second sheet 120 laminated with the first sheet 110. The configuration of the first sheet 110 and the second sheet 120 of FIGS. 5A, 5B, and 5C may be same as the configuration of the first sheet 110 and the second sheet 120 of FIGS. 3 and 4 partially or entirely.

Although, practically, the first sheet 110 and the second sheet 120 are laminated to be a single film, the first sheet 110 and the second sheet 120 are disclosed separately in FIG. 5A for the convenience of explanation of the embodiment.

According to various embodiments, a first sheet 110 comprises a first base 112, a first pattern layer 111 disposed on one side of the first base 112 and a second pattern layer 113 disposed on the other side of the first base 112. The first pattern layer 111 is disposed on the side facing the +Z axis of the first base 112 and the second pattern layer 113 is disposed on the side facing the −Z axis direction of the first base 112. A second sheet 120 comprises a second base 122, a third pattern layer disposed on one side of the second base 122 and a fourth pattern layer disposed on the other surface of the second base 122. The third pattern layer 121 is disposed on the side facing the +Z axis direction of the second base 122 and the fourth pattern layer is disposed on the side facing the −Z axis direction of the second base 122.

According to one embodiment, the first base 112 and/or the second base 122 can be a supporting configuration for the pattern layers. For example, the first base 112 and/or the second base 122 is a transparent material that can transmit light. The material for the base can be used at least one of polycarbonate-based, polysulfone-based, polyacrylate-based, polystyrene-based, polyvinyl chloride-based, polyvinyl alcohol-based, polynorbornene-based, or polyesterbased material. As a specific example, the second base 112 may be made of at least one of polyethylene terephthalate or polyethylene naphthalate.

According to various embodiments, the first pattern layer 111 and the third pattern layer 121 may have a structure corresponding to each other. The first pattern layer 111 and/or the third pattern layer 121 may include a plurality of pyramid patterns having a plurality of rows in a first direction (e.g., A direction) and a plurality of columns in a second direction (e.g., A' direction) perpendicular to the first direction. A cross-section of each of the plurality of pyramid patterns may have a triangular or trapezoidal shape. Each of the plurality of pyramid patterns may be designed to be engraved patterns when they are viewed from above the first pattern layer 111 and/or the third the pattern layer 121 (when viewed toward the −Z axis). Each of the plurality of pyramid patterns may be designed to have a size gradually increasing toward the −Z axis.

According to various embodiments, the first sheet 110 and the second sheet 120 are provided with a pattern layer on one side and the other side, that is, on both sides, respectively, of the base so that the effect of reducing light interference and color non-uniformity along with the light diffusion effect can be increased. Each pattern layer is coated with UV (ultra violet) curable resin on one side (or the other side) of the base. Micro-patterning can be implemented by applying a solution and curing it by irradiating light.

According to various embodiments, with respect to the light diffusion effect, light incident to the lower side of the second sheet 120 (e.g., the fourth pattern layer 123) may diffuse through a plurality of pyramid patterns formed on the third pattern layer 121 of the second sheet 120. The diffused light incidents to the lower side of the first sheet 110 (e.g., the second pattern layer 113) and the diffused light diffuses through a plurality of pyramid patterns formed on the first pattern layer 111 of the first sheet 110. In this process, loss of light due to refracted light refracted on the interface of the pyramid patterns and due to reflected light caused by interfacial reflection may be minimized, and a decrease in brightness may also be minimized. The pyramid patterns formed on the first pattern layer 111 and the third pattern layer 121 may include a plurality of pyramids (e.g., M×N), and the pyramid patterns having M number of rows and N number of columns pyramids can be formed to be at least partially overlapped with the light source 11a on the substrate 11.

According to various embodiments, the first sheet 110 comprises the first pattern layer 111 having a pyramid pattern with a predetermined height (or thickness) (a) and a predetermined pitch (b). The second sheet 120 includes the third pattern layer 121 having a pyramid pattern with a predetermined height (or thickness) (c) and a predetermined pitch (d). According to an embodiment, in the first pattern layer 111, the height (a) and the pitch (b) of the pyramid pattern may be defined based on a first apex angle $\theta 1$. In the third pattern layer 121, the height (c) and the pitch (d) of the pyramid pattern may be defined based on a second apex angle $\theta 2$. Here, the first apex angle $\theta 1$ will be described and the second apex angle $\theta 2$ may be applied in a same manner.

According to an embodiment, the first apex angle $\theta 1$ and/or the second apex angle $\theta 2$ may be defined as an angle between two opposing faces among four faces forming the pyramidal pattern having a trapezoidal cross-section. For example, the first apex angle $\theta 1$ and/or the second apex angle $\theta 2$ may be defined approximately within a range of 70° to 150°.

According to various embodiments, when the first apex angle $\theta 1$ is approximately 900 (e.g., approximately 87° to 93°) and the second apex angle $\theta 2$ is approximately 90° (e.g., approximately 87° to 93°), brightness (e.g., center brightness ratio) and shielding (e.g. shielding ratio) can be improved. Referring to FIGS. 5B and 5C, the effect of the brightness (e.g., center brightness ratio) and the shielding (e.g. shielding ratio) is confirmed with an experiment varying the first apex angle $\theta 1$ of the patterned layer 111 and the second apex angle $\theta 2$ of the third patterned layer 121. In Experiment #1, the first apex angle $\theta 1$ was set to be approximately 850 and the second apex angle $\theta 2$ was set to be approximately 85°. In Experiment #2, the first apex angle $\theta 1$ was set to be approximately 85° and the second vertex angle $\theta 2$ was set to be approximately 90°. In Experiment #3, the first apex angle $\theta 1$ was set to be approximately 90°, and the second vertex angle $\theta 2$ was set to be approximately 90°. In Experiment #4, the first apex angle $\theta 1$ was set to be approximately 95° and the second vertex angle $\theta 2$ was set to be approximately 90°. In Experiment #5, the first apex angle $\theta 1$ was set to be approximately 95° and the second vertex angle $\theta 2$ was set to be approximately 95°. After setting the center brightness ratio and the shielding ratio of Experiment #3 as 100% as a reference value, respectively, the center brightness ratio and the shielding ratio values of Experiments #1, #2, #4, and #5 were compared.

Referring to Experiments #1, #2, #3, #4, and #5, the cases for Experiments #1 and #2, insufficient raising shielding effect with respect to the brightness (the center brightness ratio) drop is confirmed by comparing with the reference value. In addition, for the case of Experiments #4 and #5, the excessive shielding drop with respect to the brightness (the center brightness ratio) increase is observed by comparing with the reference value. Accordingly, it is confirmed that efficiency of the brightness (the center brightness ratio) and the shielding (the shielding ratio) is relatively maximum in Experiment #3 (the first apex angle $\theta 1$ being approximately 90° and the second apex angle $\theta 2$ being approximately 90°).

Figure 6A:
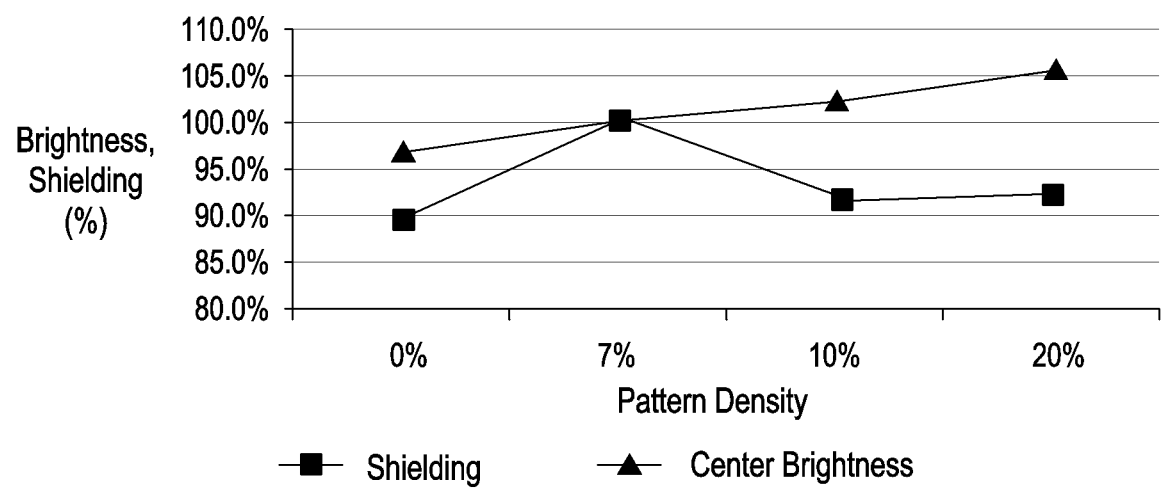
FIG. 6A is a graph illustrating a brightness ratio and a shielding ratio with respect to density of a matte pattern of an optical film according to various embodiments of the present invention.

FIG. 6A is a graph illustrating a brightness ratio and a shielding ratio with respect to density of a matte pattern of an optical film according to various embodiments of the present invention.

Figure 6B:
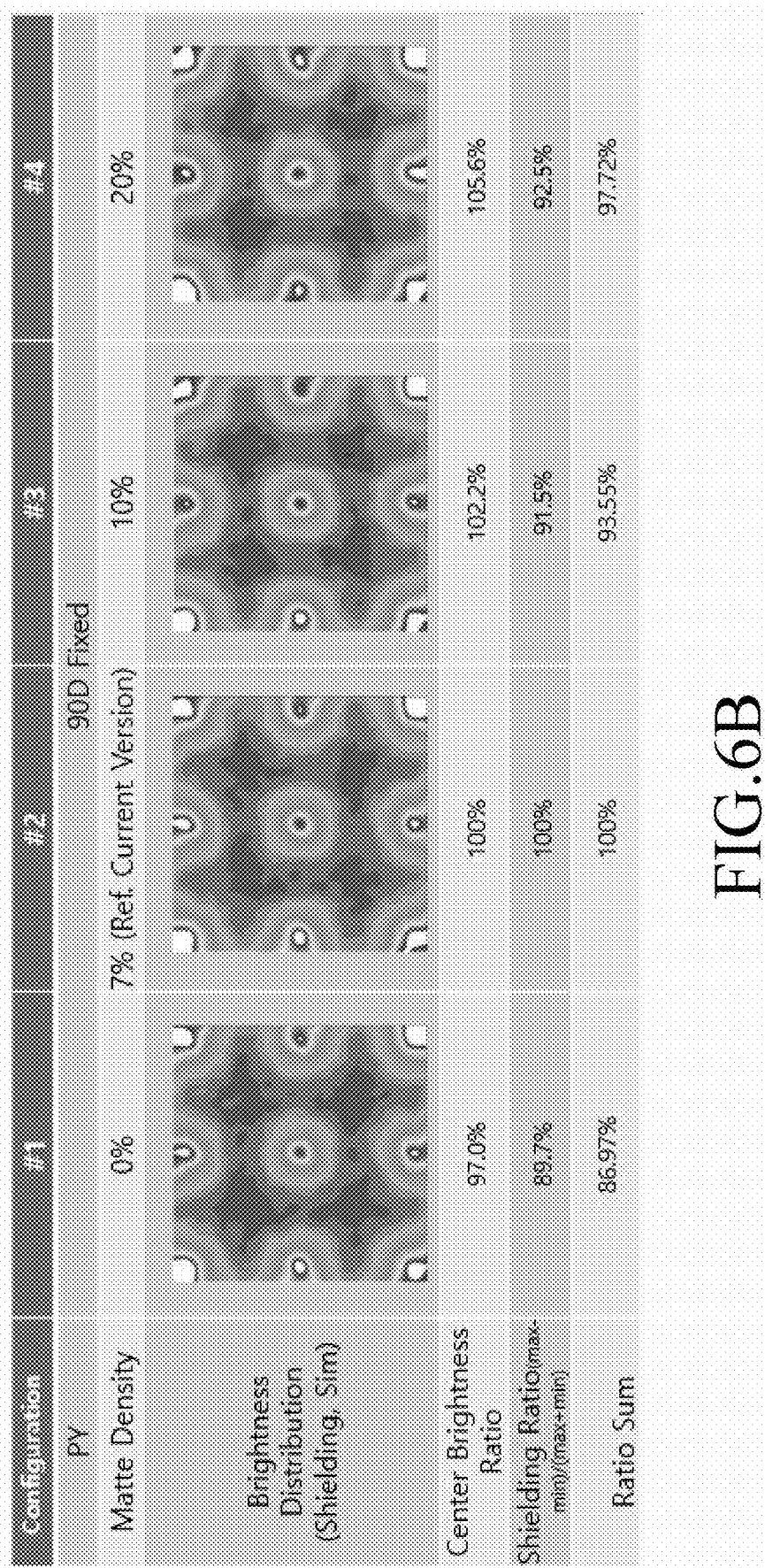
FIG. 6B is a table illustrating a brightness ratio and a shielding ratio with respect to density of a matte pattern of an optical film according to various embodiments of the present invention.

FIG. 6B is a table illustrating a brightness ratio and a shielding ratio with respect to density of a matte pattern of an optical film according to various embodiments of the present invention.

In the present disclosure, a backlight unit (e.g., the backlight unit 10 of FIGS. 1 and 2) comprises a first optical films (e.g., the optical film 100 of FIG. 5A). The first optical film 100 comprises a first sheet (e.g., the first sheet 110 of FIG. 5A) and a second sheet laminated with the first sheet 110 (e.g., the second sheet 120 of FIG. 5A). The configuration of the first sheet 110 and the second sheet 120 of FIGS. 6A and 6B can be same as the configuration of the first sheet 110 and the second sheet 120 of FIGS. 3 to 5C, partially or entirely.

According to various embodiments, the first sheet 110 comprise a first base 112, a first pattern layer 111 disposed on one side of the first base 112, and a second pattern layer 113 disposed on the other side of the first base 112. The second sheet 120 comprises a second base 122, a third pattern layer 121 disposed on one side of the second base 122, and a fourth pattern layer 123 disposed on the other side of the first base 122.

According to various embodiments, the second pattern layer 113 and the fourth pattern layer 123 may have a structure corresponding to each other. The second pattern layer 113 and the fourth pattern layer 123 may form a matte pattern. For example, a plurality of protrusion portions (e.g., convex) may be irregularly arranged in the second pattern layer 113 and/or the fourth pattern layer 123. Each of the plurality of protrusion portions may be formed randomly from each other and may protrude downward.

According to an embodiment, unlike the first pattern layer 111 and/or the third pattern layer 121, the plurality of protrusion portions of the second pattern layer 113 and/or the fourth pattern layer 123 may not have a direction. At least a portion of the plurality of protrusion portions of the second pattern layer 113 and/or the fourth pattern layer 123 may have a curved shape. At least a portion of the plurality of protrusion portions may be designed to have a size gradually decreasing toward the −Z axis.

According to one embodiment, the second pattern layer 113 includes an adhesive material and the first sheet 110 and the second sheet 120 can be laminated by adhering the plurality of protrusion portions of the second pattern layer 113 to the plurality of pyramid patterns of the third pattern layer 121. For example, the second pattern layer 113 may be directly adhered to the third pattern layer 121 without a separate adhesive layer because the second pattern layer 113 can be formed of an adhesive resin as a whole According to various embodiments, in a matte pattern layer (e.g., the density of the second pattern layer 113 and/or the fourth pattern layer 123 of approximately 7% (e.g., approximately 5% to 9%)), the brightness (e.g., the center brightness ratio) and the shielding (e.g., the shielding ratio) can be improved. The density may be defined as the area of the plurality of protrusion portions in the total area of the matte pattern layer.

Referring FIG. 6A and FIG. 6B, the effect of the brightness (e.g., the center brightness ratio) and the shielding (e.g., the shielding ratio) is confirmed with an experiment fixing a first apex angle of the first pattern layer 111 and a second apex of the third pattern layer 121 at approximately 90° while varying the density of the matte pattern layer of the second pattern layer 113 and the fourth the pattern layer 123. In Experiment #1, the density of the matte pattern layer was set to be approximately 0%. In Experiment #2, the density of the matte pattern layer was set to be approximately 7%. In Experiment #3, the density of the matte pattern layer was set to be approximately 10%. In Experiment #4, the density of the matte pattern layer was set to be approximately 20%.

After setting the center brightness ratio and the shielding ratio of Experiment #2 to be 100% as a reference value, respectively, the values of the center brightness ratio and the shielding ratio of Experiments #1, #3, and #4 were compared. Referring to Experiments #1, #2, #3, and #4, for the case of Experiment #1, it is confirmed that the shielding drop is occurred along with the brightness (the center brightness ratio) drop by comparing with the reference value. In addition, for the case of experiments #3 and #4, the excessive shielding drop with respect to the brightness (the center brightness ratio) increase is observed by comparing with the reference value. Accordingly, it is confirmed efficiency of the brightness (the center brightness ratio) and the shielding (the shielding ratio) is relatively maximum in Experiment #2 (the density of the matte pattern layer being approximately 7%).

Figure 7A:
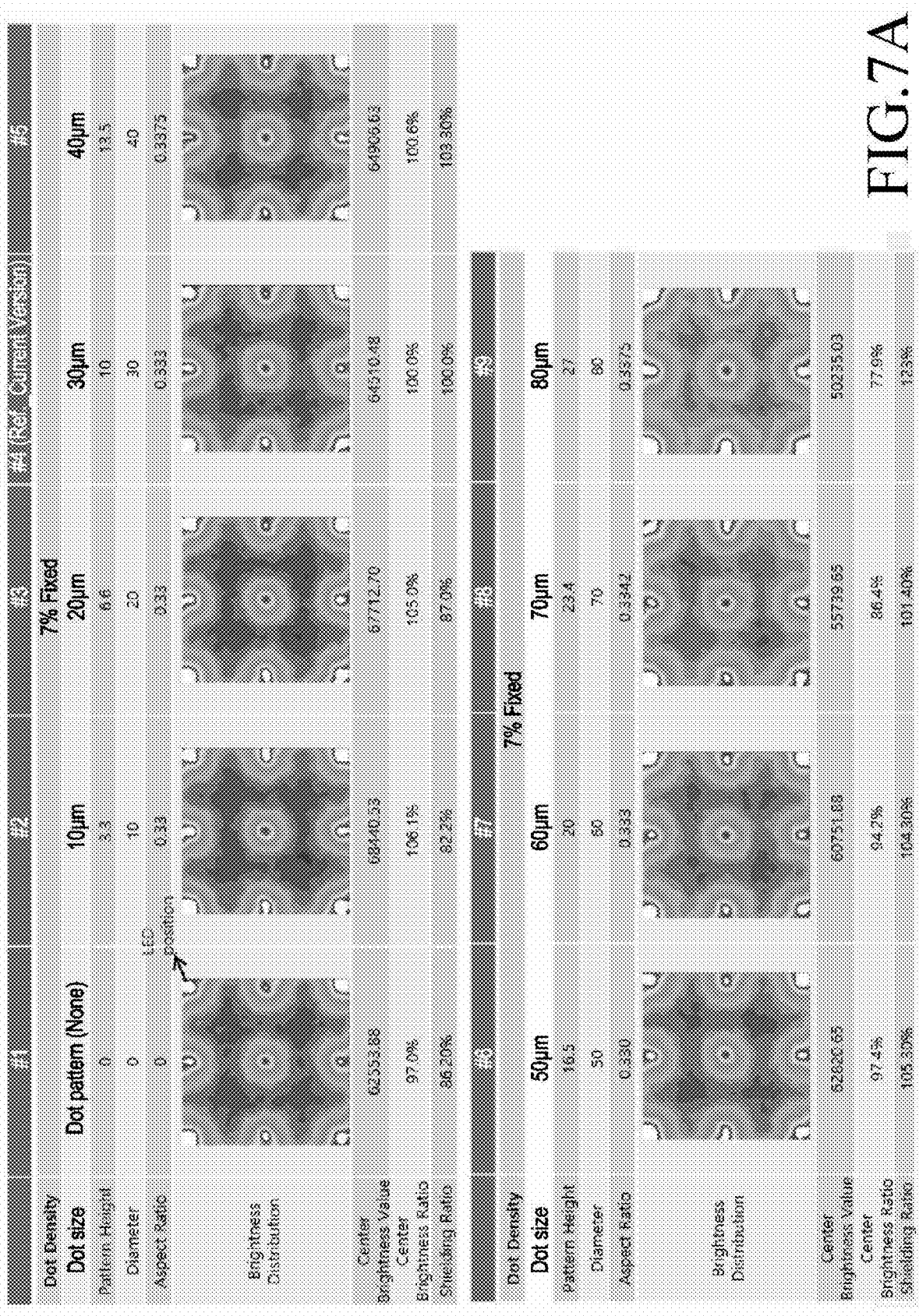

FIGS. 7A and 7B are tables illustrating a brightness ratio and a shielding ratio with respect to a diameter of a mat pattern of an optical film according to various embodiments of the present invention.

Figure 7C:
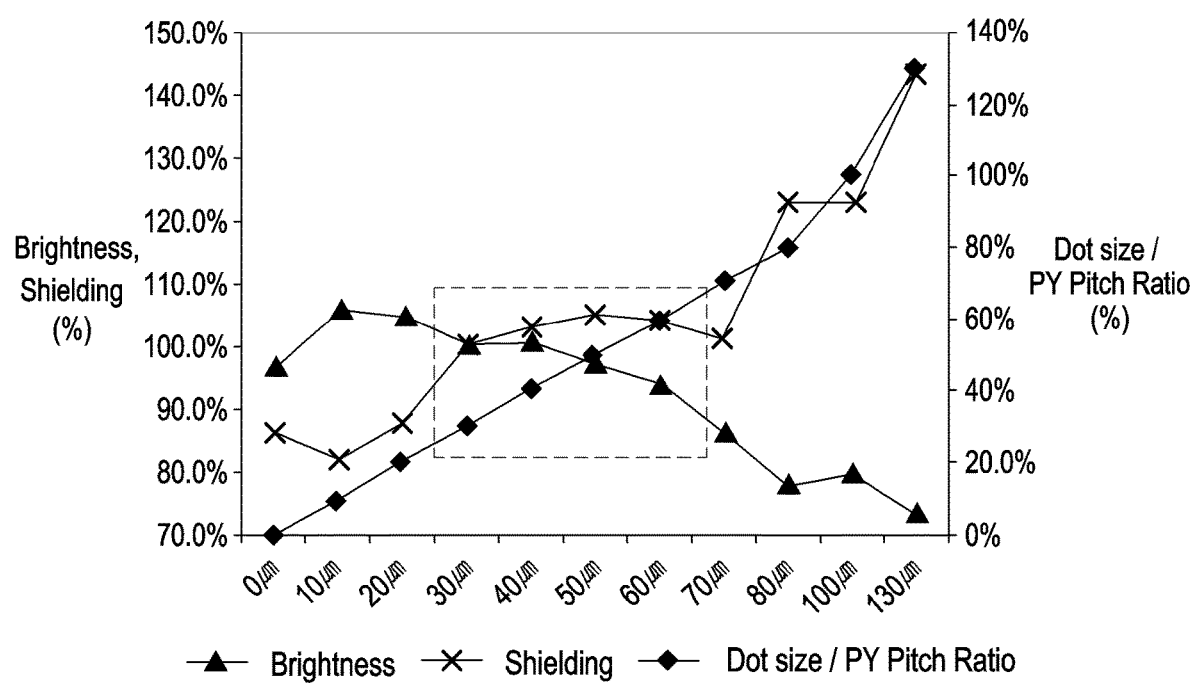
FIG. 7C is a graph illustrating a brightness ratio and a shielding ratio with respect to a diameter of a matte pattern of an optical film according to various embodiments of the present invention.

FIG. 7C is a graph illustrating a brightness ratio and a shielding ratio with respect to a diameter of a matte pattern of an optical film according to various embodiments of the present invention.

In the present disclosure, a backlight unit (e.g., the backlight unit 10 of FIGS. 1 and 2) comprises a first optical films (e.g., the optical film 100 of FIG. 5A). The first optical film 100 comprises a first sheet (e.g., the first sheet 110 of FIG. 5A) and a second sheet laminated with the first sheet 110 (e.g., the second sheet 120 of FIG. 5A). The configuration of the first sheet 110 and the second sheet 120 of FIGS. 7A, 7B, and 7C can be same as the configuration of the first sheet 110 and the second sheet 120 of FIGS. 3 to 6B, partially or entirely.

According to various embodiments, the first sheet 110 comprise a first base 112, a first pattern layer 111 disposed on one side of the first base 112, and a second pattern layer 113 disposed on the other side of the first base 112. The second sheet 120 comprises a second base 122, a third pattern layer 121 disposed on one side of the second base 122, and a fourth pattern layer 123 disposed on the other side of the first base 122.

According to various embodiments, the second pattern layer 113 and the fourth pattern layer 123 may have a structure corresponding to each other. The second pattern layer 113 and the fourth pattern layer 123 may form a matte pattern. For example, a plurality of protrusion portions (e.g., convex) may be irregularly arranged in the second pattern layer 113 and/or the fourth pattern layer 123. Each of the plurality of protrusion portions may be formed randomly from each other and may protrude downward.

According to various embodiments, when a diameter of the matte pattern layer (e.g., the second pattern layer 113 and/or the fourth pattern layer 123) is approximately 30 μm to 60 μm, the brightness (e.g., the center brightness ratio) and the shielding (e.g., the shielding ratio) can be improved. For example, the diameter may be defined as an average value of diameters of each of the plurality of protrusion portions of the matte pattern layer. As another example, the diameter may be defined as an average value of dot sizes of each of the plurality of protrusion portions.

Referring to FIGS. 7A, 7B and 7C, the effect of the brightness (e.g., the center brightness ratio) and the shielding (e.g., the shielding ratio) is confirmed with an experiment fixing a first apex angle of the first pattern layer 111 and a second apex of the third pattern layer 121 at approximately 90°, fixing a density of the matte pattern layer of the second pattern layer 113 and/or the fourth pattern layer 123 at approximately 7%, and fixing an aspect ratio of the matte pattern layer at approximately 0.33 to 0.34 while varying the diameter of the matte pattern layers. The aspect ratio of the matte pattern layer may be defined as the height of the pattern/the diameter of the pattern.

In Experiment #1, the average value of the diameters of the plurality of protrusion portions of the matte pattern layer was set to be 0 (no protrusion portions). In Experiment #2, the average value of the diameters of the plurality of protrusion portions of the matte pattern layer was set to be approximately 10 μm. In Experiment #3, the average value of the diameters of the plurality of protrusion portions of the matte pattern layer was set to be approximately 20 μm. In Experiment #4, the average value of the diameters of the plurality of protrusion portions of the matt pattern layer was set to be approximately 30 μm. In Experiment #5, the average value of the diameters of the plurality of protrusion portions of the matte pattern layer was set to be approximately 40 μm. In Experiment #6, the average value of the diameters of the plurality of protrusion portions of the matte pattern layer was set to be approximately 50 µm. In Experiment #7, the average value of the diameters of the plurality of protrusion portions of the matte pattern layer was set to be approximately 60 µm. In Experiment #8, the average value of the diameters of the plurality of protrusion portions of the matte pattern layer was set to be approximately 70 µm. In Experiment #9, the average value of the diameters of the plurality of protrusion portions of the matte pattern layer was set to be approximately 80 µm. In Experiment #10, the average value of the diameters of the plurality of protrusion portions of the matte pattern layer was set to be approximately 100 µm. In Experiment #11, the average value of the diameters of the plurality of protrusion portions of the matte pattern layer was set to be approximately 130 µm. After setting the center brightness ratio and shielding ratio of Experiment #4 as 100% as a reference value, respectively, it is compared with the values of the center brightness ratio and the shielding ratio of Experiments #1 to #3 and #5 to #11.

Referring to Experiments #1 to #11, for the case of Experiment #1, it can be seen that the shielding drop occurs with the brightness (the center brightness ratio) drop compared to the reference value. In addition, for the case of Experiments #2 and #3, it can be seen that excessive shielding drop is occurred with respect to the brightness (the center brightness ratio) increase compared with the reference value. In addition, for the case of Experiment #8, it can be seen that excessive brightness (the center brightness ratio) drop is occurred with respect to the shielding increase compared with the reference value. Moreover, for the case of Experiments #9, #10, and #11, it can be seen that excessive brightness (the center brightness ratio) drop is occurred compared with the reference value. Accordingly, it is confirmed efficiency of the brightness (the center brightness ratio) and the shielding (the shielding ratio) is relatively maximum in Experiments #4, #5, #6, and #7 (the diameter of the matte pattern layer being approximately 30 µm, 40 µm, 50 µm, 60 µm).

Referring FIG. 7C and the following [Table 1], when a pitch of a pyramid pattern (e.g., the pyramid pattern of the first pattern layer 111 or the pyramid pattern of the third pattern layer 121) with respect to the diameter of the matte of the matte pattern layer (e.g., the matte pattern of the second pattern layer 113 or the matte pattern of the fourth pattern layer 123) is in a range of approximately 30% to 60%, it is confirmed that excellent characteristics of the shielding and the brightness. For example, from the shielding point of view, as the diameter (size) of the matte pattern layer increases, the shielding increases. However, it can be seen that the brightness decreases. Accordingly, it can be observed that the correlation between the shielding and the brightness tends to be opposite. Especially, when the diameter (size) of the matte pattern layer is approximately 60% or more of the pyramid pattern, it can be seen that the amount of the brightness loss increases as significantly the shielding increases. In addition, when the diameter (size) of the matte pattern layer is approximately 30% or less of the pyramid pattern, it can be seen that the shielding decreases compared to the brightness increase.

TABLE 1

| Dot Size | Aspect Ratio | Brightness | Shielding | Ratio of Dot Size/PY Pitch |
|---|---|---|---|---|
| 0 | 0.000 | 97.0% | 86.20% | 0 |
| 10 µm | 0.330 | 106.1% | 82.20% | 10% |
| 20 µm | 0.330 | 105.0% | 87.00% | 20% |
| 30 µm | 0.333 | 100.0% | 100% | 30% |
| 40 µm | 0.338 | 100.61% | 103.30% | 40% |
| 50 µm | 0.330 | 97.38% | 105.30% | 50% |
| 60 µm | 0.333 | 94.17% | 104% | 60% |
| 70 µm | 0.334 | 86.40% | 101% | 70% |
| 80 µm | 0.338 | 77.90% | 123% | 80% |
| 100 µm | 0.330 | 79.60% | 123% | 100% |
| 130 µm | 0.338 | 73.50% | 143% | 130% |
| Correlation Coefficient | 0.56 | −0.81 | 0.89 | 1 |

Figure 8A:
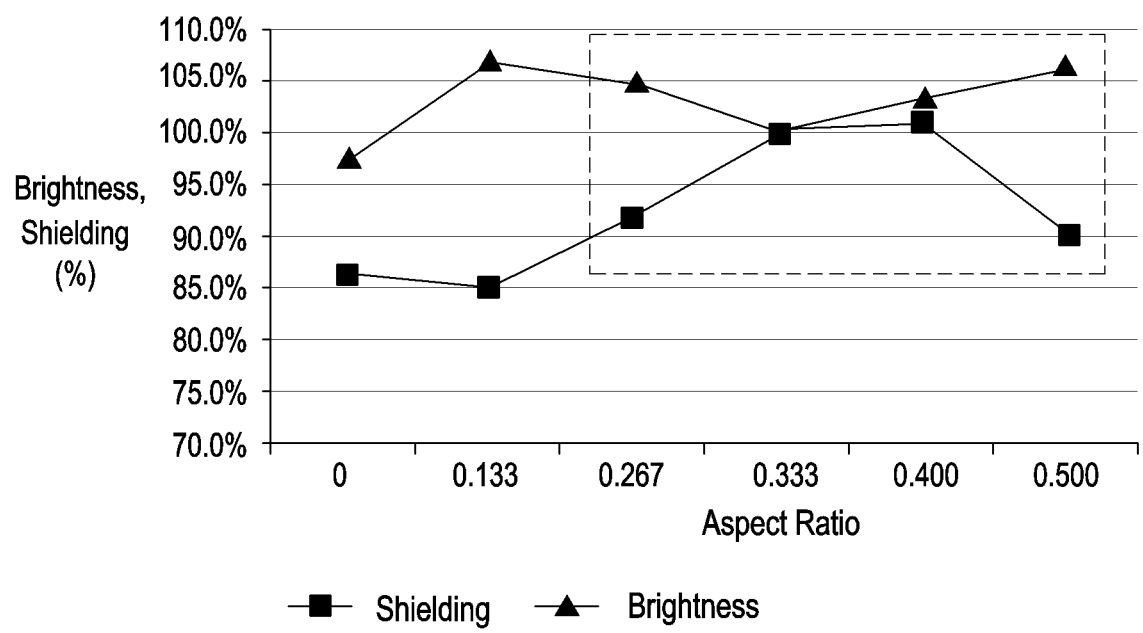
FIG. 8A is a graph illustrating a brightness ratio and a shielding ratio with respect to an aspect ratio of a matte pattern of an optical film according to various embodiments of the present invention.

FIG. 8A is a graph illustrating a brightness ratio and a shielding ratio with respect to an aspect ratio of a matte pattern of an optical film according to various embodiments of the present invention.

Figure 8B:
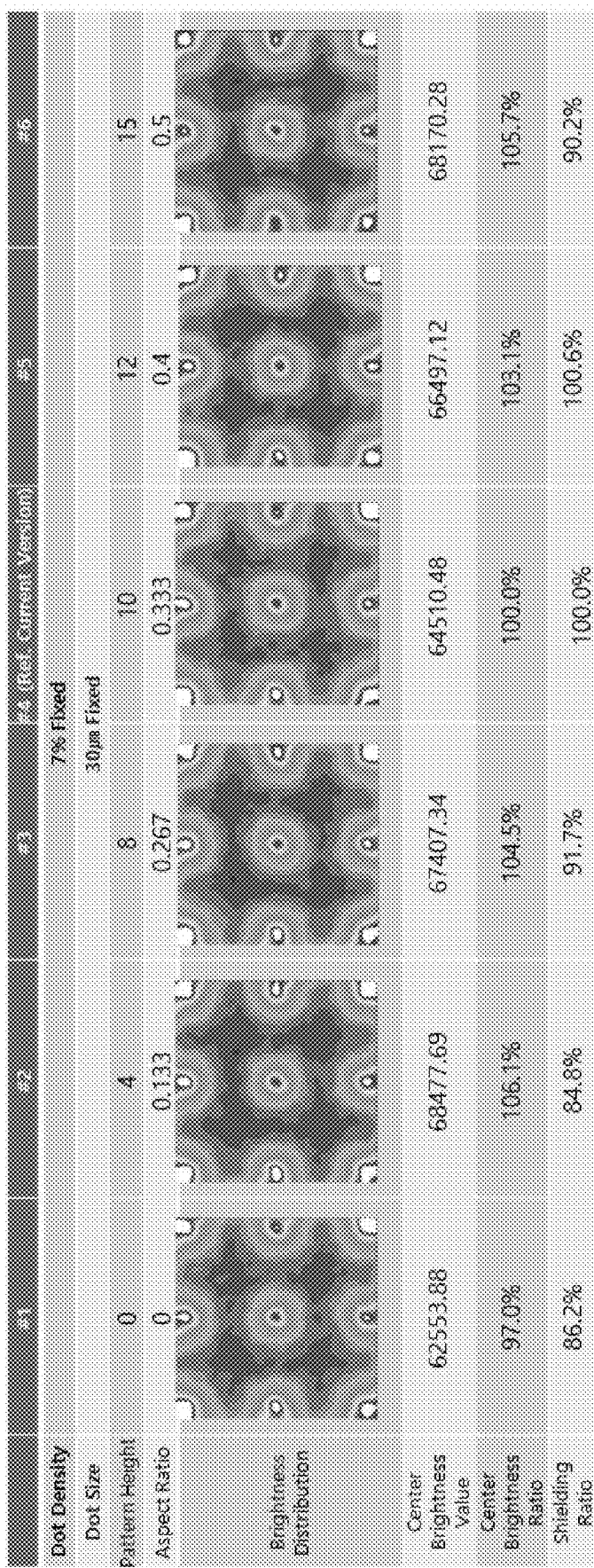
FIG. 8B is a table illustrating a brightness ratio and a shielding ratio with respect to an aspect ratio of a matte pattern of an optical film according to various embodiments of the present invention.

FIG. 8B is a table illustrating a brightness ratio and a shielding ratio with respect to an aspect ratio of a matte pattern of an optical film according to various embodiments of the present invention.

In the present disclosure, a backlight unit (e.g., the backlight unit 10 of FIGS. 1 and 2) comprises a first optical films (e.g., the optical film 100 of FIG. 5A). The first optical film 100 comprises a first sheet (e.g., the first sheet 110 of FIG. 5A) and a second sheet laminated with the first sheet 110 (e.g., the second sheet 120 of FIG. 5A). The configuration of the first sheet 110 and the second sheet 120 of FIGS. 8A and 8B can be same as the configuration of the first sheet 110 and the second sheet 120 of FIGS. 3 to 7C, partially or entirely.

According to various embodiments, the first sheet 110 comprise a first base 112, a first pattern layer 111 disposed on one side of the first base 112, and a second pattern layer 113 disposed on the other side of the first base 112. The second sheet 120 comprises a second base 122, a third pattern layer 121 disposed on one side of the second base 122, and a fourth pattern layer 123 disposed on the other side of the first base 122.

According to various embodiments, the second pattern layer 113 and the fourth pattern layer 123 may have a structure corresponding to each other. The second pattern layer 113 and the fourth pattern layer 123 may form a matte pattern. For example, a plurality of protrusion portions (e.g., convex) may be irregularly arranged in the second pattern layer 113 and/or the fourth pattern layer 123. Each of the plurality of protrusion portions may be formed randomly from each other and may protrude downward.

According to various embodiments, when an aspect ratio of the matte pattern layer (e.g., the second pattern layer 113 and/or the fourth pattern layer 123) is in a range of approximately 0.23 to 0.5, the brightness (e.g., the center brightness ratio) and the shielding (e.g., the shielding ratio) can be improved.

Referring to FIGS. 8A and 8B, the effect of the brightness (e.g., the center brightness ratio) and the shielding (e.g., the shielding ratio) is confirmed with an experiment fixing a first apex angle of the first pattern layer 111 and a second apex of the third pattern layer 121 at approximately 90°, fixing a density of the matte pattern layer of the second pattern layer 113 and/or the fourth pattern layer 123 at approximately 7%, and fixing a diameter of the matte pattern layers (an average size of each protrusion portion) at approximately 30 µm while varying the aspect ratio of the matte pattern layer. The aspect ratio of the matte pattern layer may be defined as the height of the pattern/the diameter of the pattern. The height of the pattern may be defined as an average value of the heights of each of the plurality of protrusion portions of the matte pattern layer, and the diameter of the pattern may be defined as the average value of the diameters of each of the plurality of protrusion portions of the matte pattern layer. As the diameter of the pattern is fixed, the height and the aspect ratio of the pattern may be proportionally increased.

In Experiment #1, the aspect ratio of the matte pattern layer was set to be 0 (e.g., the height of the pattern being 0). In Experiment #2, the aspect ratio of the matte pattern layer was set to be approximately 0.133 (e.g., the height of the pattern being approximately 4 μm). In Experiment #3, the aspect ratio of the matte pattern layer was set to be approximately 0.267 (e.g., the height of the pattern being approximately 8 μm). In Experiment #4, the aspect ratio of the matte pattern layer was set to be 0.333 (e.g., the height of the pattern being approximately 10 μm). In Experiment #5, the aspect ratio of the matte pattern layer was set to be approximately 0.4 (e.g., the height of the pattern being approximately 12 μm). In Experiment #6, the aspect ratio of the matte pattern layer was set to be approximately 0.5 (e.g., the height of the pattern being approximately 15 μm). After setting the center brightness ratio and the shielding ratio of Experiment #4 as 100% as a reference value, respectively, the values of the center brightness ratio and the shielding ratio for Experiments #1 to #3, #5, and #6 were compared.

Referring Experiments #1 to #6, for the case of Experiment #1, it can be seen that the shielding drop occurs with the brightness (the center brightness ratio) drop compared to the reference value. In addition, for the case of Experiment #2, it can be seen that excessive shielding drop is occurred with respect to the brightness (the center brightness ratio) increase compared with the reference value. It is confirmed that a range where the brightness (the center brightness ratio) and the shielding (the shielding ratio) is 90% or more compared to the reference value is for the case of Experiments #3, #4, #5 and #6. Accordingly, it is confirmed efficiency of the brightness (the center brightness ratio) and is relatively improved in Experiments #3, #4, #5 and #6 (e.g., range of the aspect ratio being approximately 0.23 to 0.5).

Referring to [Table 2] below, the height of pattern with respect to the diameter in the matte pattern layer can be obtained from the range of the aspect ratio (e.g., approximately 0.23 to 0.5) with showing excellent brightness and shielding ratio.

TABLE 2

| Aspect Ratio-Pattern Height | Diameter: 30 μm | Diameter: 60 μm |
|---|---|---|
| Aspect Ratio: 0.23 | Pattern Height: 6.9 μm | Pattern Height: 13.8 μm |
| Aspect Ratio: 0.5 | Pattern Height: 15 μm | Pattern Height: 30 μm |

For example, at the aspect ratio 0.23, the pattern height is approximately 6.9 μm considering the diameter of the matte pattern layer is approximately 30 μm, and the pattern height may be approximately 15 μm considering the diameter of the matte pattern layer is approximately 60 μm. In another example, at the aspect ratio of 0.5, the pattern height is approximately 15 μm considering the diameter of the matte pattern layer is approximately 30 μm, and the pattern height may be approximately 30 μm considering the diameter of the matte pattern layer is approximately 60 μm. Accordingly, the range where the brightness (the center brightness ratio) and the shielding (the shielding ratio) is 90% or more can be set as the aspect ratio of the matte pattern layer being in the range of approximately 0.23 to 0.5, the pattern diameter being approximately 30 μm to 60 μm, and the pattern height being approximately 6.9 μm to 30 μm.

Figure 9A:
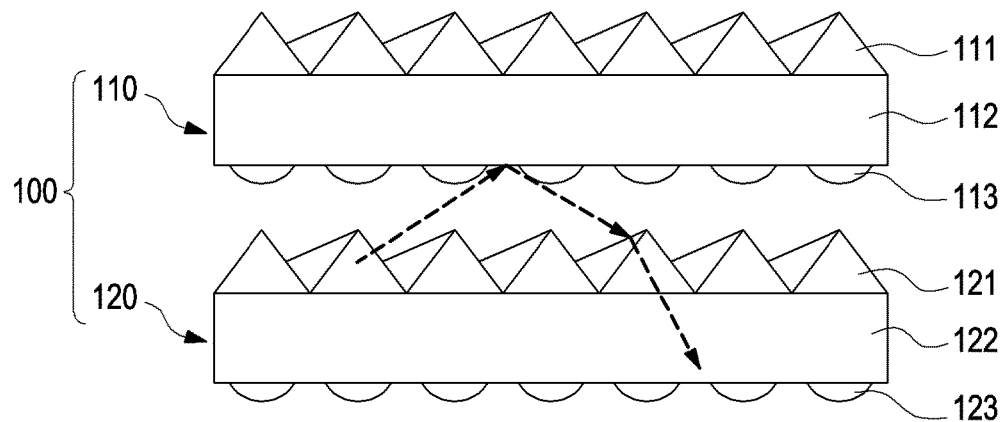
FIG. 9A is a drawing of a matte pattern of a haze-related optical film according to various embodiments of the present invention.

FIG. 9A is a drawing of a matte pattern of a haze-related optical film according to various embodiments of the present invention.

Figure 9B:
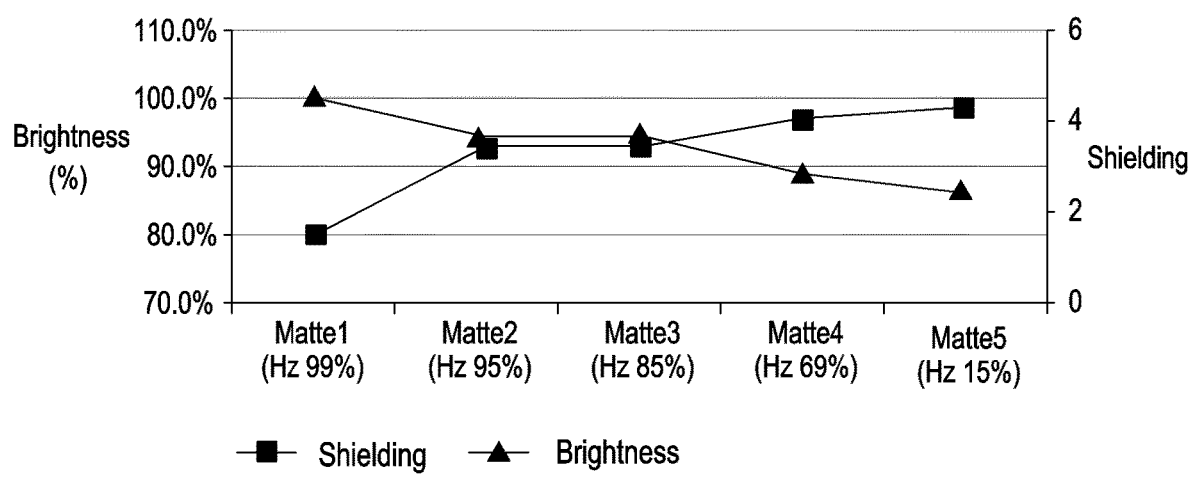
FIG. 9B is a graph illustrating a brightness and/or a shielding correlation with respect to haze of a matte pattern of an optical film according to various embodiments of the present invention.

FIG. 9B is a graph illustrating a brightness and/or a shielding correlation with respect to haze of a matte pattern of an optical film according to various embodiments of the present invention.

Figure 9C:
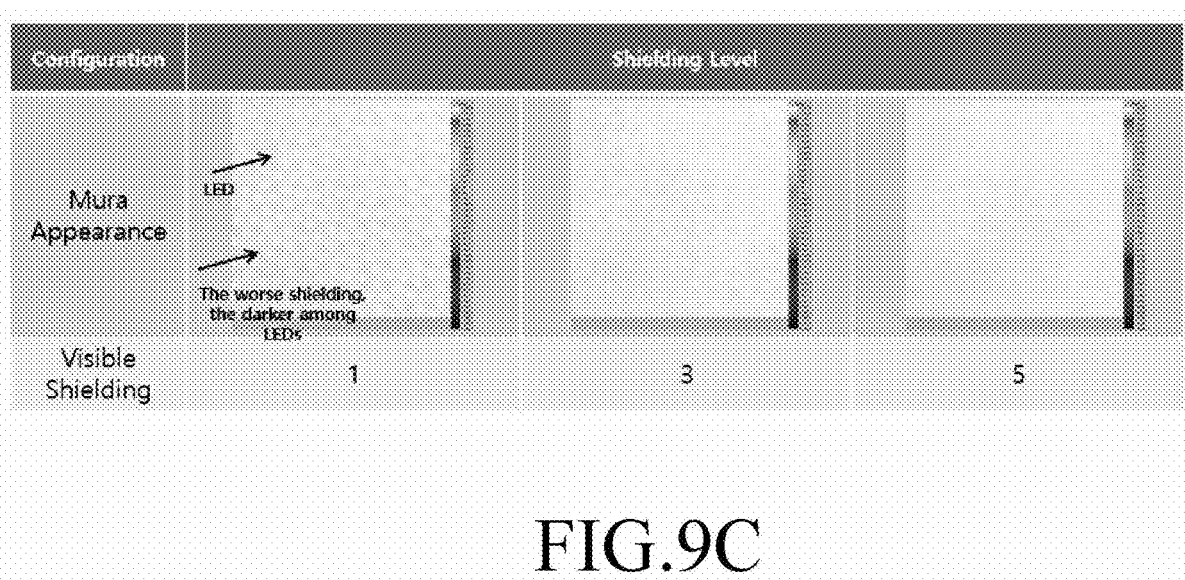
FIG. 9C is a table explaining a shielding effect with respect to a matte pattern of the optical film according to various embodiments of the present invention.

FIG. 9C is a table explaining a shielding effect with respect to a matte pattern of the optical film according to various embodiments of the present invention.

Figure 10A:
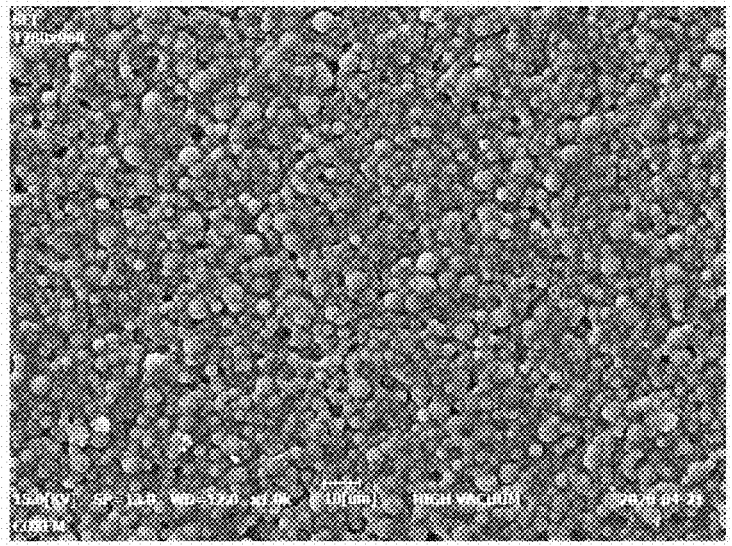
FIG. 10A is a portion of an enlarged image of a matte pattern layer according to an embodiment of the present invention.

FIG. 10A is a portion of an enlarged image of a matte pattern layer according to an embodiment of the present invention.

Figure 10B:
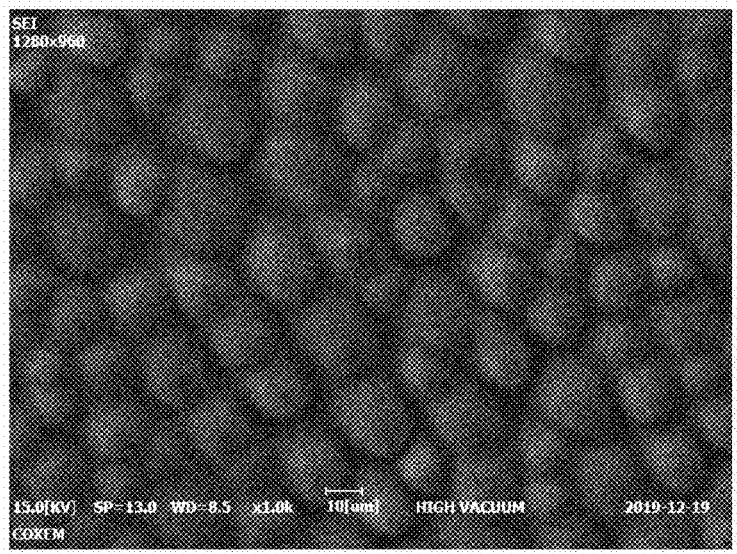
FIG. 10B is a portion of an enlarged image of a matte pattern layer according to an embodiment of the present invention.

FIG. 10B is a portion of an enlarged image of a matte pattern layer according to an embodiment of the present invention.

Figure 10C:
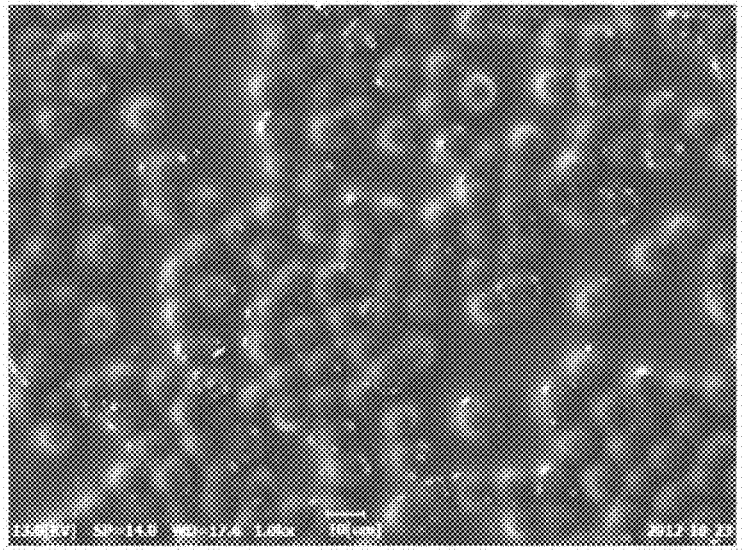
FIG. 10C is a portion of an enlarged image of a matte pattern layer according to an embodiment of the present invention.

FIG. 10C is a portion of an enlarged image of a matte pattern layer according to an embodiment of the present invention.

Figure 10D:
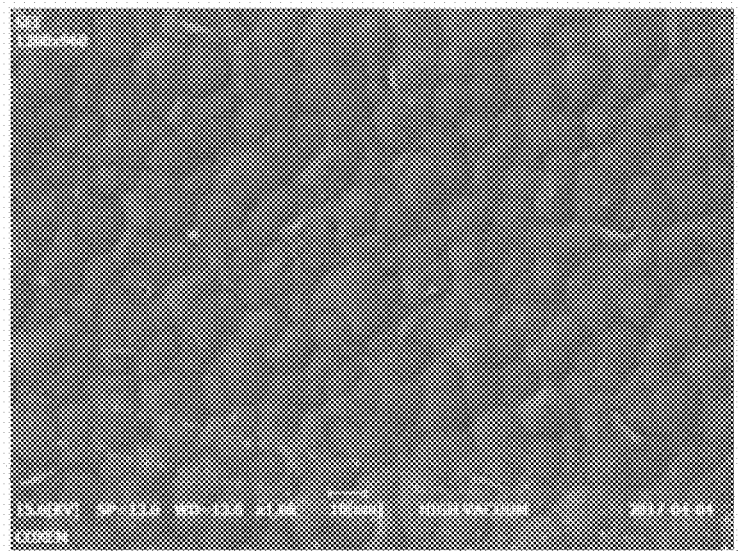
FIG. 10D is a portion of an enlarged image of a matte pattern layer according to an embodiment of the present invention.

FIG. 10D is a portion of an enlarged image of a matte pattern layer according to an embodiment of the present invention.

Figure 10E:
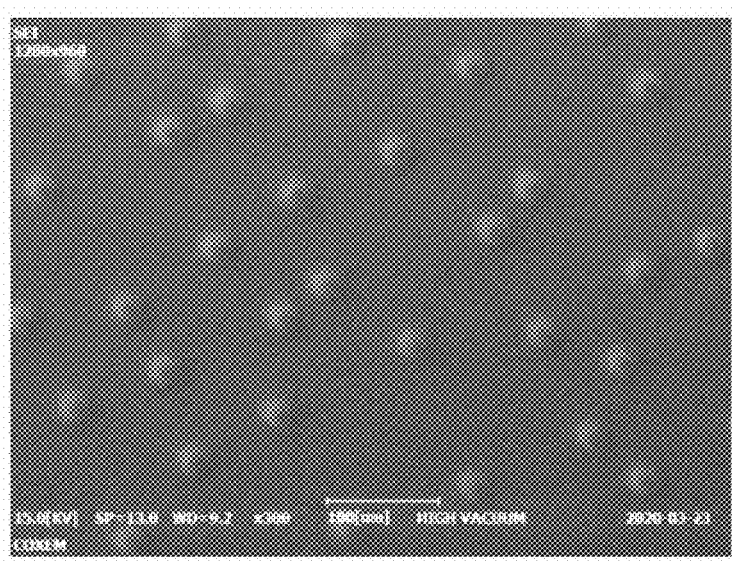
FIG. 10E is a portion of an enlarged image of a matte pattern layer according to an embodiment of the present invention.

FIG. 10E is a portion of an enlarged image of a matte pattern layer according to an embodiment of the present invention.

In the present disclosure, a backlight unit (e.g., the backlight unit 10 of FIGS. 1 and 2) comprises a first optical films (e.g., the optical film 100 of FIG. 5A). The first optical film 100 comprises a first sheet (e.g., the first sheet 110 of FIG. 5A) and a second sheet laminated with the first sheet 110 (e.g., the second sheet 120 of FIG. 5A). The configuration of the first sheet 110 and the second sheet 120 of FIGS. 9A to 10E can be same as the configuration of the first sheet 110 and the second sheet 120 of FIGS. 3 to 8B, partially or entirely.

According to various embodiments, the first sheet 110 comprise a first base 112, a first pattern layer 111 disposed on one side of the first base 112, and a second pattern layer 113 disposed on the other side of the first base 112. The second sheet 120 comprises a second base 122, a third pattern layer 121 disposed on one side of the second base 122, and a fourth pattern layer 123 disposed on the other side of the first base 122.

According to various embodiments, the second pattern layer 113 and the fourth pattern layer 123 may have a structure corresponding to each other. The second pattern layer 113 and the fourth pattern layer 123 may form a matte pattern. For example, a plurality of protrusion portions (e.g., convex) may be irregularly arranged in the second pattern layer 113 and/or the fourth pattern layer 123. Each of the plurality of protrusion portions may be formed randomly from each other and may protrude downward.

According to various embodiments, a matte pattern layer (e.g., the second pattern layer 113 and/or the fourth pattern layer 123) may use various mattes having different haze (Hz). For example, the type of matte pattern layer can be at least one of a first matte (e.g., Matte 1, see FIG. 10A), a second matte (e.g., Matte 2, see FIG. 10B), a third matte (e.g., Matte 3, see FIG. 10C), a fourth Matte (e.g., Matte 4, see FIG. 10D), or a fifth matte (e.g., Matte 5, see FIG. 10E).

According to one embodiment, as the haze (Hz) decreases with respect to the type of the matte pattern layer, the shielding efficiency may be improved. Referring to FIG. 9A, as the pattern density is decreased in the matte pattern layer, an empty area excluding the plurality of protrusion portions may be increased. Therefore, the light transmitted due to retroreflection of the pyramid patterns of the second sheet 120 may increase the amount of total reflection caused by the empty area of the matte pattern layer of the first sheet 110. Specifically, the light emitted from the pyramid pattern layer of the second sheet 120 is incident to and transmitted through the protrusion portions of the matte pattern layer of the first sheet 110, and when the emitted light is contacted in an area other than the protrusion portions of the matte pattern layer existing (e.g., an empty area), light cycling may be occurred because the total reflection is occurred thereby the light path toward to the pyramid pattern layer is formed. Accordingly, it is possible for an optical film to maintain the brightness performance and to improve the shielding performance. For example, the brightness may not be decreased as the protrusion portions of the matte pattern layer are formed. For another example, as the haze (Hz) of the matte pattern layer is lowered, the uniformity of the overall emitted light may be improved because the amount of light from the total reflection at the interface (e.g., the empty area of the matte pattern layer) is increased thereby the proportion of direct light output is reduced.

According to various embodiments, for the matte pattern layer (e.g., the second pattern layer 113 and/or the fourth pattern layer 123) where its haze is in a range of approximately 13% to 85%, the shielding efficiency (e.g., the shielding ratio) can be improved. Referring to FIG. 9B, FIG. 9C, and [Table 3] below, the effect of the brightness (e.g., the center brightness ratio) and the shielding (e.g., the shielding ratio) is confirmed with an experiment varying the haze of the matte pattern layer. The shielding effect (e.g., the shielding in Table 3) can be evaluated by measuring each surface illuminance of the matte pattern layer (measuring equipment: Mura (surface illuminance measuring equipment)) while varying the matte patterns (e.g., the second pattern layer 113 and/or the fourth pattern layer 123) of a shielding sheet in a configuration where a light source (e.g., LED), one or two sheets of a shielding sheet (e.g., the first sheet 110, and/or the second sheet 120), a color conversion sheet and a prism sheet are stacked. For example, by visually observing each of the above surface illuminance, the shielding level was set to be 1 (low) to 5 (high) and FIG. 9C can be referred to.

When the first matte (e.g., Matte 1) having a haze value of about 99% is used as the matte pattern layer, it can be seen that the shielding ratio is approximately 1.5. As another example, when the second matte (e.g., Matte 2) having a haze value of approximately 95% is used as the matte pattern layer, it can be seen that the shielding ratio is approximately 3.5. For another example, when the third matte (e.g., Matte 3) having a haze value of approximately 85% is used as the matte pattern layer, it can be seen that the shielding ratio is approximately 3.5. For another example, when the fourth matte (e.g., Matte 4) having a haze value of approximately 69% is used as the matte pattern layer, it can be seen that the shielding ratio is approximately 4.0. For another example, when the fifth matte (e.g., Matte 5) having a haze value of approximately 13% is used as the matte pattern layer, it can be seen that the shielding ratio is approximately 4.3. As the shielding ratio increases, it provides a higher shielding. Accordingly, it can be seen that the shielding performance is improved as the haze value decreases.

TABLE 3

| | Matte 1 | Matte 2 | Matte 3 | Matte 5 | r | n | t-value | p-value |
|---|---|---|---|---|---|---|---|---|
| Shielding | 1.5 | 3.5 | 3.5 | 4.3 | — | — | — | — |
| Hz | 99% | 95% | 85% | 13% | −0.69 | 4 | −1.349 | 0.319 |
| Pattern Density | 100% | 100% | 30% | 6.80% | −0.72 | 4 | −1.456 | 0.283 |
| Pattern Distance | 1 | 1 | 30 | 150 | 0.68 | 4 | 1.306 | 0.322 |
| Pattern Diameter (μm) | 5 | 20 | 8 | 30 | 0.80 | 4 | 1.875 | 0.202 |
| Pattern Height | 2.5 | 7 | 4 | 7 | 0.84 | 4 | 2.165 | 0.163 |
| Aspect Ratio | 0.5 | 0.35 | 0.5 | 0.23 | −0.34 | 4 | −0.516 | 0.657 |
| Empty Area/ Aspect Ratio | 2 | 2.85 | 60 | 652 | 0.65 | 4 | 1.198 | 0.354 |
| Ra | 0.33 | 1.16 | 1.2 | 0.29 | 0.26 | 4 | 0.379 | 0.741 |
| Rz | 2.31 | 6.99 | 5.65 | 6.4 | 0.92 | 4 | 3.352 | 0.079 |
| Rz/Ra | 7.00 | 6.03 | 4.71 | 22.07 | 0.54 | 4 | 0.896 | 0.456 |
| Ra/Rz | 0.14 | 0.17 | 0.21 | 0.05 | −0.32 | 4 | −0.470 | 0.685 |

Referring back to [Table 3], the effect of the shielding (e.g., the shielding ratio) is confirmed with an experiment varying the aspect ratio of the pattern of the matte pattern layer. For example, when the first matte (e.g., Matte 1) having the aspect ratio value of approximately 0.5 is used as the matte pattern layer, it can be seen that the shielding ratio is approximately 1.5. As another example, when the second matte (e.g., Matte 2) having the aspect ratio value of approximately 0.35 is used as the matte pattern layer, it can be seen that the shielding ratio is approximately 3.5. For another example, when the third matte (e.g., Matte 3) having the aspect ratio value of approximately 0.5 is used as the pattern layer, it can be seen that the shielding ratio is approximately 3.5. For another example, when the fifth matte (e.g., Matte 5) having the aspect ratio value of approximately 0.23 is used as the matte pattern layer, it can be seen that the shielding ratio is approximately 4.3. As the shielding ratio increases, it provides a higher shielding. Accordingly, it can be confirmed that the shielding performance is generally improved as the aspect ratio value is decreased.

Referring back to [Table 3], the effect of the shielding (e.g., the shielding ratio) is confirmed with an experiment varying the density of the pattern of the matte pattern layer. The shielding effect is disclosed by comparing the value of the pattern density of other matte pattern layers having decreasing values with respect to the reference value after setting the value of the pattern density having 100% for those matte pattern layers (e.g., Matte 1 and Matte 2) among others. For example, when the first matte (e.g., Matte 1) having the pattern density value of approximately 100% is used as the matte pattern layer, it can be seen that the shielding ratio is approximately 1.5. As another example, when the second matte (e.g., Matte 2) having the pattern density value of approximately 100% is used as the matte pattern layer, it can be seen that the shielding ratio is approximately 3.5. For another example, when the third matte (e.g., Matte 3) having the pattern density value of approximately 30% is used as the pattern layer, it can be seen that the shielding ratio is approximately 3.5. For another example, when the fifth matte (e.g., Matte 5) having the pattern density value of approximately 6.8% is used as the matte pattern layer, it can be seen that the shielding ratio is approximately 4.3. As the shielding ratio increases, it provides a higher shielding. Accordingly, it can be confirmed that the shielding performance is generally improved as the pattern density value is decreased.

According to an embodiment of the present disclosure, it can be seen that the effect of the shielding (e.g., the shielding ratio) increases as the haze value, the aspect ratio value and the pattern density value of the matte pattern layer decreases. The shielding effect depends on the haze value, the aspect ratio, the pattern density value and/or its combination of those values of the matte pattern layer and it is also confirmed that the shielding effect may be affected by the order of the haze, the aspect ratio and the pattern density.

Figure 11A:
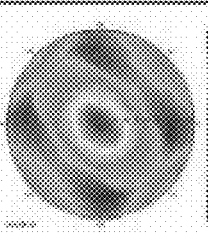
FIG. 11A is a table illustrating optical characteristics with respect to various optical film configurations according to various embodiments of the present invention.

FIG. 11A is a table illustrating optical characteristics with respect to various optical film configurations according to various embodiments of the present invention.

Figure 11B:
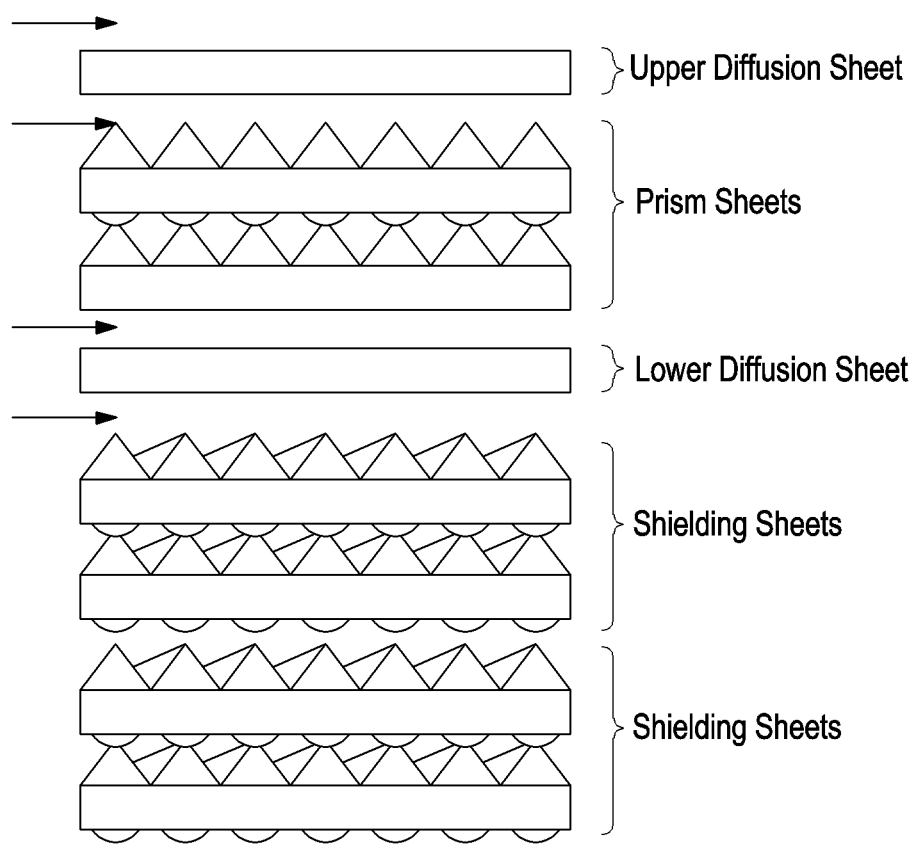
FIG. 11B is a drawing illustrating an optical film configuration according to various embodiments of the present invention.

FIG. 11B is a drawing illustrating an optical film configuration according to various embodiments of the present invention.

In the present disclosure, a backlight unit (e.g., the backlight unit 10 of FIGS. 1 and 2) comprises a first optical films (e.g., the optical film 100 of FIG. 5A). The first optical film 100 comprises a first sheet (e.g., the first sheet 110 of FIG. 5A) and a second sheet laminated with the first sheet 110 (e.g., the second sheet 120 of FIG. 5A). The configuration of the first optical film 100 comprising the first sheet 110 and the second sheet 120 of FIGS. 11A and 11B can be same as the configuration of the first optical film 100 comprising the first sheet 110 and the second sheet 120 of FIGS. 3 to 10E, partially or entirely.

Referring to FIGS. 11A and 11B, it is confirmed that excellent shielding effect can be obtained by comparing a conventional first configuration (a), a conventional second configuration (b), and a configuration (c) of an embodiment of the present invention. When the color changes from dark gray at the edges to dark gray at the center in the viewing angle distribution image, it can be defined as the intensity of light increases.

According to one embodiment, it is confirmed that the transmitted light from a shielding sheet (e.g., the first optical film 100) is focused at the center of emission when the viewing angle distribution image (at the measurement position ①) of the configuration (c) of an embodiment of the present invention is compared with the respective image of the conventional first configuration (a) and the conventional second configuration (b). In addition, in a configuration where the shielding sheet and a lower diffusion sheet are stacked, it is confirmed that the amount of direct light is increased because the light is focused at the center when the viewing angle distribution image (at the measurement position ②) of the configuration (c) of an embodiment of the present invention is compared with the respective image of the conventional first configuration (a) and the conventional second configuration (b). Moreover, in a configuration where the shielding sheet, the lower diffusion sheet, and prism sheets (e.g., prism sheets 15, 16 in FIGS. 1 and 2) are stacked, it is confirmed that the light distribution of the transmitted light from a shielding sheet is evenly distributed and the light is focused at the center when the viewing angle distribution image (at the measurement position ③) of the configuration (c) of an embodiment of the present invention is compared with the respective image of the conventional first configuration (a) and the conventional second configuration (b). Accordingly, it is confirmed that a relatively large amount of light emitted from the center passes through the prism sheets and it is also confirmed that the shielding performance is improved by increasing the retroreflection efficiency. Furthermore, in a configuration where the shielding sheet, the lower diffusion sheet, the prism sheets (e.g., prism sheets 15, 16 in FIGS. 1 and 2), and a upper diffusion sheet are stacked, it is confirmed that the light distribution of the transmitted light from a shielding sheet is evenly distributed and the light is focused at the center when the viewing angle distribution image (at the measurement position ④) of the configuration (c) of an embodiment of the present invention is compared with the respective image of the conventional first configuration (a) and the conventional second configuration (b).

The illustrated and above-describe embodiments for an optical film and a backlight unit including the optical film are not intended to be limiting in any way, and any such modifications to the embodiments described are intended to be included within the spirit and scope of the present invention and protected by the claims that follow.

What is claimed is:

1. A backlight unit comprising:
   a light source;
   a color conversion sheet disposed above the light source for converting a color of light emitted from the light source; and
   an optical film disposed on the color conversion sheet, the optical film comprising:
   a first sheet having a first pattern layer including a plurality of pyramid patterns formed on one entire side of a first base and a second pattern layer consisting of a plurality of adhesive irregular protrusion portions forming a different pattern from the plurality of pyramid patterns and irregularly disposed on the other entire side of the first base,
   a second sheet having a third pattern layer including a plurality of pyramid patterns formed on one entire side of a second base and a fourth pattern layer corresponding to the second pattern layer and formed on the other entire side of the second base,
   wherein the fourth pattern layer includes a plurality of irregular protrusion portions, and
   wherein the first sheet and the second sheet are laminated by the plurality of adhesive irregular protrusion portions of the second pattern layer.

2. The backlight unit according to claim 1, wherein the plurality of pyramid patterns of the first pattern layer and the plurality of pyramid patterns of the third pattern layer have a plurality of rows in a first direction and a plurality of columns in a second direction, and wherein the first direction and the second direction are perpendicular to each other.

3. The backlight unit according to claim 1, wherein the plurality of pyramid patterns of the first pattern layer are intaglio pyramid patterns formed by etching the one side of the first base, and wherein the plurality of pyramid patterns of the third pattern layer are intaglio pyramid patterns formed by etching the one side of the second base.

4. The backlight unit according to claim 1, wherein a refractive index of the first pattern layer of the first sheet and a refractive index of the third pattern layer or the second sheet are the same as each other.

5. The backlight unit according to claim 4, wherein the refractive index of the first pattern layer and the refractive index of the third pattern layer are approximately 1.47 to 1.70.

6. The backlight unit according to claim 1, wherein each of the plurality of pyramid patterns forms an apex angle defined as an angle between two opposing faces among four faces of a pyramid shape and wherein a first apex angle of the first pattern layer is approximately 87° to 93° and a second apex angle of the third pattern layer is approximately 87° to 93°.

7. The backlight unit according to claim 6, wherein a density of the plurality of protrusion portions occupying in an area of the second and fourth pattern layer is approximately 5% to 9%.

8. The backlight unit according to claim 7, wherein an average diameter of the plurality of protrusion portions in the second pattern layer is approximately 30 μm and an average diameter of the plurality of protrusion portions in the fourth pattern layer is approximately 60 μm.

9. The backlight unit according to claim 8, wherein an aspect ratio of the second pattern layer and the fourth pattern layer is in the range of approximately 0.23 to 0.5.

10. The backlight unit according to claim 8, wherein an average height of the plurality of protrusion portions in the second pattern layer is approximately 6.9 μm and an average height of the plurality of protrusion portions in the fourth pattern layer is approximately 30 μm.

11. The backlight unit according to claim 1, wherein a haze of the second pattern layer and the fourth pattern layer is approximately 13% to 85%.

12. The backlight unit according to claim 1, wherein the plurality of irregular protrusion portions of the second pattern layer and the fourth pattern layer have a curved shape.

13. An optical film comprising:
   a first sheet having a first pattern layer including a plurality of pyramid patterns formed on one entire side of a first base and a second pattern layer consisting of a plurality of adhesive irregular protrusion portions forming a different pattern from the plurality of pyramid patterns and irregularly disposed on the other entire side of the first base,
   a second sheet having a third pattern layer including a plurality of pyramid patterns formed on one entire side of a second base and a fourth pattern layer corresponding to the second pattern layer and formed on the other entire side of the second base,
   wherein the fourth pattern layer include a plurality of irregular protrusion portions, and
   wherein the first sheet and the second sheet are laminated by the plurality of adhesive irregular protrusion portions of the second pattern layer.

14. The optical film according to claim 13, wherein a refractive index of the first pattern layer of the first sheet and a refractive index of the third pattern layer of the second sheet are the same as each other.

15. The optical film according to claim 13, wherein each of the plurality of pyramid patterns forms an apex angle defined as an angle between two opposing faces among four faces of a pyramid shape and wherein a first apex angle of the first pattern layer is approximately 87° to 93° and a second apex angle of the third pattern layer is approximately 87° to 93°.

16. The optical film according to claim 15, wherein a density of the plurality of protrusion portions occupying in an area of the second and fourth pattern layer is approximately 5% to 9%.

17. The optical film according to claim 16, wherein an average diameter of the plurality of protrusion portions in the second pattern layer is approximately 30 μm and an average diameter of the plurality of protrusion portions in the fourth pattern layer is approximately 60 μm.

18. The optical film according to claim 17, wherein an aspect ratio of the second pattern layer and the fourth pattern layer is in the range of approximately 0.23 to 0.5.

19. The optical film according to claim 17, wherein an average height of the plurality of protrusion portions in the second pattern layer is approximately 6.9 μm and an average height of the plurality of protrusion portions in the fourth pattern layer is approximately 30 μm.

20. The optical film according to claim 13, wherein a haze of the second pattern layer and the fourth pattern layer is approximately 13% to 85%.

* * * * *